US009112604B2

(12) United States Patent
Gariepy et al.

(10) Patent No.: US 9,112,604 B2
(45) Date of Patent: Aug. 18, 2015

(54) REFERENCE-BASED IN-BAND OSNR MEASUREMENT ON POLARIZATION-MULTIPLEXED SIGNALS

(75) Inventors: Daniel Gariepy, Quebec (CA); Gang He, Quebec (CA)

(73) Assignee: EXFO INC., Quebec (CA)

( * ) Notice: Subject to any disclaimer, the term of this patent is extended or adjusted under 35 U.S.C. 154(b) by 302 days.

(21) Appl. No.: 13/501,708

(22) PCT Filed: Feb. 14, 2011

(86) PCT No.: PCT/CA2011/050085
§ 371 (c)(1),
(2), (4) Date: Apr. 12, 2012

(87) PCT Pub. No.: WO2011/097734
PCT Pub. Date: Aug. 18, 2011

(65) Prior Publication Data
US 2012/0201533 A1    Aug. 9, 2012

Related U.S. Application Data

(60) Provisional application No. 61/304,584, filed on Feb. 15, 2010.

(51) Int. Cl.
*H04B 17/00*    (2006.01)
*H04B 10/079*    (2013.01)
(52) U.S. Cl.
CPC .............................. *H04B 10/07953* (2013.01)
(58) Field of Classification Search
USPC ........................................................ 398/9–38
See application file for complete search history.

(56) References Cited

U.S. PATENT DOCUMENTS 5,430,795 A * 7/1995 Taga et al. ...................... 398/192
5,513,029 A * 4/1996 Roberts ........................... 398/32
(Continued)

FOREIGN PATENT DOCUMENTS

CN    1731708 A    2/2006
CN    101167273 A    4/2008
(Continued)

OTHER PUBLICATIONS

M. P. Dlubek, et al., "Method for Optical Signal-to-Noise Ratio Monitoring Based on Modulation Spectrum Assessment," The Institution of Engineering and Technology 2009, pp. 86-92.
(Continued)

*Primary Examiner* — Ken Vanderpuye
*Assistant Examiner* — Dibson Sanchez
(74) *Attorney, Agent, or Firm* — Norton Rose Fulbright Canada LLP; Alexandre Daoust

(57) ABSTRACT

There is provided a method for determining an in-band noise parameter, such as the Optical Signal-to-Noise Ratio (OSNR), on an optical signal-under-test (SUT) propagating along an optical communication link and comprising a data-carrying signal contribution of any arbitrary degree of polarization and a noise contribution. A spectral shape trace of data-carrying signal contribution in the SUT is estimated using a reference optical spectrum trace of a reference signal which comprises a data-carrying signal contribution that is spectrally representative of the data-carrying signal contribution of the SUT and a noise contribution which is at least approximately known. The data-carrying signal contribution is mathematically discriminated from said noise contribution in the SUT using the spectral shape trace and the test optical spectrum trace. The in-band noise parameter is then determined at least from the mathematically discriminated noise contribution.

20 Claims, 19 Drawing Sheets

(56) References Cited

U.S. PATENT DOCUMENTS

| | | | |
|---|---|---|---|
| 5,654,816 A * | 8/1997 | Fishman | 359/349 |
| 5,712,716 A * | 1/1998 | Vanoli et al. | 398/34 |
| 5,790,289 A * | 8/1998 | Taga et al. | 398/79 |
| 6,271,945 B1 * | 8/2001 | Terahara | 398/26 |
| 6,317,231 B1 * | 11/2001 | Al-Salameh et al. | 398/34 |
| 6,396,051 B1 * | 5/2002 | Li et al. | 250/227.18 |
| 6,396,574 B1 * | 5/2002 | Lee et al. | 356/73.1 |
| 6,433,864 B1 * | 8/2002 | Chung et al. | 356/73.1 |
| 6,570,686 B1 * | 5/2003 | Kim | 398/79 |
| 6,654,561 B1 * | 11/2003 | Terahara et al. | 398/26 |
| 6,839,131 B2 * | 1/2005 | Kwon | 356/73.1 |
| 6,907,197 B2 | 6/2005 | Heath et al. | |
| 6,975,395 B1 * | 12/2005 | Gentieu et al. | 356/326 |
| 6,993,257 B2 * | 1/2006 | Althouse et al. | 398/34 |
| 7,116,908 B2 * | 10/2006 | Uda et al. | 398/94 |
| 7,146,099 B2 * | 12/2006 | Kamalov et al. | 398/26 |
| 7,177,541 B2 * | 2/2007 | Chung et al. | 398/26 |
| 7,295,774 B2 * | 11/2007 | Bülow | 398/25 |
| 7,542,674 B1 * | 6/2009 | Barozzi et al. | 398/33 |
| 7,689,131 B2 | 3/2010 | Uekama et al. | |
| 7,756,369 B2 * | 7/2010 | Rudolph et al. | 385/24 |
| 8,073,325 B2 * | 12/2011 | Goto | 398/26 |
| 8,160,443 B2 * | 4/2012 | Brodsky et al. | 398/26 |
| 8,655,170 B2 * | 2/2014 | Shukunami et al. | 398/26 |
| 2002/0089665 A1 | 7/2002 | Ishihara et al. | |
| 2002/0131104 A1 * | 9/2002 | Johnson et al. | 359/124 |
| 2002/0150217 A1 * | 10/2002 | Haines | 379/22.02 |
| 2002/0154353 A1 * | 10/2002 | Heath et al. | 359/124 |
| 2003/0011835 A1 | 1/2003 | Elbers et al. | |
| 2003/0030859 A1 * | 2/2003 | Youn et al. | 359/110 |
| 2004/0067057 A1 * | 4/2004 | Akiyama et al. | 398/26 |
| 2004/0114923 A1 * | 6/2004 | Chung et al. | 398/26 |
| 2004/0160596 A1 * | 8/2004 | He et al. | 356/73.1 |
| 2005/0232627 A1 * | 10/2005 | Sun et al. | 398/26 |
| 2007/0058984 A1 * | 3/2007 | Charlet et al. | 398/160 |
| 2007/0280689 A1 * | 12/2007 | Boffi et al. | 398/65 |
| 2007/0297043 A1 | 12/2007 | Kao et al. | |
| 2008/0124076 A1 | 5/2008 | Rudolph et al. | |
| 2008/0205886 A1 * | 8/2008 | Anderson et al. | 398/26 |
| 2009/0142052 A1 * | 6/2009 | Pegg et al. | 398/26 |
| 2010/0028008 A1 * | 2/2010 | Nakajima | 398/83 |
| 2010/0226661 A1 * | 9/2010 | Hiraizumi | 398/194 |
| 2012/0114330 A1 * | 5/2012 | Bruno et al. | 398/26 |
| 2012/0155861 A1 | 6/2012 | Liu | |

FOREIGN PATENT DOCUMENTS

| | | |
|---|---|---|
| WO | 2008122123 | 10/2008 |
| WO | 2010139355 | 12/2010 |
| WO | 2011022889 | 3/2011 |

OTHER PUBLICATIONS

D. Gariepy, et al., "Novel OSA-Based Method for In-Band OSNR Measurement," EXFO Electro-Optimal Engineering Inc., 3 pgs, Mar. 2010.

Ruben S. Luis, et al., "Optical Signal-to-Noise Ratio Estimation Using Reference Asynchronous Histograms," Journal of Lightwave Technology, vol. 27, No. 6, Mar. 15, 2009, pp. 731-743.

J. H. Lee, et al., "A Review of the Polarization-Nulling Technique for Monitoring Optical-Signal-to-Noise Ratio in. Dynamic WDM Networks," Journal of Lightwave Technology, vol. 24, No. 11, Nov. 2006, pp. 4162-4171.

Chao Lu, et al., "Optical Performance Monitoring Techniques for High Capacity Optical Networks," Photonic Research Centre, Department of Electronic & Information Engineering , PCSN-11, CSNDSP 2010, pp. 678-681.

* cited by examiner

REFERENCE-BASED IN-BAND OSNR MEASUREMENT ON POLARIZATION-MULTIPLEXED SIGNALS

CROSS-REFERENCE TO RELATED APPLICATIONS

This application claims priority under 35 USC §119(e) of U.S. provisional patent application(s) 61/304,584 filed Feb. 15, 2010; the specification of which is hereby incorporated by reference.

TECHNICAL FIELD

The invention relates to the determination of the in-band noise in optical telecommunication applications. More specifically, the invention relates to the determination of the in-band noise on polarization-multiplexed optical signals.

BACKGROUND OF THE ART

In order to maximize the information content transmitted over a given spectral bandwidth (often measured in bits per Hz of spectral bandwidth), polarization multiplexing (referred to as "Pol-Mux") is being increasingly used with new transmission formats. The underlying idea is that the spectral density (conveniently measured in units of bits/Hz) can be effectively doubled by employing two orthogonally polarized data-carrying signals sharing the same optical signal bandwidth. Normally, these two orthogonally polarized signals are transmitted with approximately the same intensity, rendering the total resultant light effectively unpolarized as seen from a test and measurement instrument having low electronic detection bandwidth, such as Optical Spectrum Analyzers (OSA).

The Optical Signal-to-Noise Ratio (OSNR) is a direct indicator of the quality of signal carried by an optical telecommunication link. Under normal and proper operating conditions, the OSNR of an optical communication link is typically high, often in excess of 15 dB or 20 dB, or even greater. The dominant component of the noise in an optical communication link is typically unpolarized Amplified Spontaneous Emission (ASE), which is a broadband noise source contributed by the optical amplifiers in the link. In general, the ASE may be considered to be spectrally uniform across the small wavelength range spanning the signal spectral width.

The IEC 61280-2-9 Fiber-optic communication subsystem test procedures—Part 2-9 standards (ed. 1.0 b: 2002) provides a standard method for determining OSNR in Dense Wavelength Division Multiplexing (DWDM) networks. This method is based on the assumption that the interchannel noise level is representative of the noise level at the signal peak position. The method interpolates the power level of the noise outside the signal bandwidth to evaluate the in-band noise in the signal bandwidth. Increased modulation rates, which enlarge the signal bandwidth, and increased channel density, reduce the interchannel width; therefore resulting in severe spectral characteristics requirements for the optical spectrum analyzers used to perform the measurement. The procedures described in the standards are able to cope with these difficulties when the noise level of adjacent peaks is mostly continuous. For example, the standards propose a two-scan procedure to first measure a broad modulated peak with a larger resolution bandwidth to capture the entire signal peak and then determine the noise using a narrow resolution bandwidth to minimize the contributions of the main and adjacent peaks on the interchannel noise level. Alternatively, commercial Optical Spectrum Analyzers (OSA) (such as EXFO's FTB-5240, in versions available before 2007) implement a related procedure by performing an integrated peak calculation and fine noise determination in a single scan.

However, to strictly comply with the standards recommendation, the noise level should be determined at the mid-channel spacing between peaks. In the case where noise is spectrally filtered outside the optical signal bandwidth, for instance, after passing through multiplexers or demultiplexers—such as Reconfigurable Optical Add Drop Multiplexers (ROADM)—the mid-spacing noise level is no longer representative of the in-band noise level, which is the relevant parameter for the OSNR determination. The interpolation of the interchannel noise level then becomes unreliable. This can be mitigated by relying on a very sharp spectral response of the OSA filter and adaptive processing to determine the noise level at the shoulders where the noise meets the base of a signal profile within the channel bandwidth. However, increased modulation rates combined with narrow filtering of multiplexers and demultiplexers is making it increasingly difficult to achieve a reliable measurement of the noise level within the channel bandwidth.

Alternative in-band OSNR measurement methods have been developed for DWDM network applications. Such methods include the active polarization-nulling method (see J. H. Lee et al., "OSNR Monitoring Technique Using Polarization-Nulling Method", IEEE Photonics Technology Letters, Vol. 13, No. 1, January 2001) and the Passive Polarization-Induced Discrimination (PPID) approach (see International Patent Application Publication WO 2008/122123 A1 to Gariépy et al., commonly owned by The Applicant). However, such methods are based on the assumption that the signal is generally highly polarized, an assumption that is not valid in the case of polarization-multiplexed signals.

For the case of most polarization-multiplexed signals, the "signal", as detected on a photodiode having low bandwidth electronics for instance, appears unpolarized, and hence, these above-mentioned in-band OSNR measurement methods cannot be used to reliably provide the OSNR measurement.

In order to measure the noise level or the OSNR on polarization-multiplexed signals, system manufacturers and operators currently have to resort to turning off the signal at the transmitter in order to measure the noise level and thereby determine the OSNR. A first limitation of this method is that it requires making certain assumptions about the noise variations that occur upon turning off the signal for which the OSNR needs to be measured. The OSNR measurement uncertainty depends, for example, on the number of channels on the link sharing the same amplified paths. In cases where the measurement is to be carried out on a system that is in operation, such a method involving turning off the signal has the important practical limitation that it implies a service interruption for the channel of interest and possible disruption of the other channels on the system.

There is therefore a need for a method to measure in-band noise parameters such as the OSNR on polarization-multiplexed signals or any other unpolarized signals, without service interruption.

SUMMARY

It is an object of the present invention to provide a method for measuring in-band OSNR which addresses at least one of the above concerns.

There is provided a method for determining an in-band noise parameter, such as the OSNR, on an optical Signal-Under-Test (SUT) propagating along an optical communication link and comprising a data-carrying signal contribution of any arbitrary degree of polarization (polarization multiplexed signals for example) and a noise contribution within an optical signal bandwidth. The provided method is based on the knowledge of the spectral shape of the signal contribution. Based on this knowledge, the signal and the noise contributions may be mathematically discriminated from one another on an optical spectrum trace of the SUT.

Knowledge of the spectral shape of the signal contribution may come from the acquisition of an optical spectrum trace of a reference signal taken at a different point, generally upstream, along the same optical communication link (i.e. the reference signal originates from the same optical transmitter), where the OSNR is known or where the signal can be considered free of ASE noise. Considering that, within the optical signal bandwidth, the spectral shape of the signal does not significantly change along the communication link, the signal contribution of such a reference signal is spectrally representative of the signal contribution of the signal-under-test. Of the embodiments described herein, this one which uses a reference signal taken at a different point along the same optical communication link generally minimizes the measurement uncertainties.

Knowledge of the spectral shape of the signal contribution may also come from the acquisition of an optical spectrum trace of a reference signal taken on a different optical communication link on the network originating from an optical transmitter that is distinct but is optically equivalent to the optical transmitter at the source of the SUT. Such a reference signal has a signal contribution that is spectrally representative of the signal contribution of the signal-under-test. For example, the point where the reference signal is taken may be at the physical location where the SUT is characterized, thereby obtaining both the SUT and reference optical spectrum traces at the same location. If the reference signal is taken immediately at the output of the optical transmitter, i.e. before the signal is optically amplified, its noise contribution may be considered negligible.

Knowledge of the spectral shape of the signal contribution may also come from the prior acquisition of an optical spectrum trace of a reference signal originating from an optically equivalent optical transmitter from any network.

Finally, knowledge of the spectral shape of the signal contribution may also come from the generation of a simulated or theoretical spectrally-resolved trace of a reference signal representative of the signal contribution of the SUT.

It is noted that the provided method only requires knowledge of the relative distribution of the optical power over the optical signal bandwidth, for both the SUT and the reference signal. No absolute power level value is required. Hence, the optical spectrum trace acquisitions can be made via tap monitoring ports on the optical communication link for example, thus allowing non-intrusive measurement and no service interruption.

There is provided a method for determining an in-band noise parameter, such as the Optical Signal-to-Noise Ratio (OSNR), on an optical signal-under-test (SUT) propagating along an optical communication link and comprising a data-carrying signal contribution of any arbitrary degree of polarization and a noise contribution. A spectral shape trace of signal contribution in the SUT is estimated using a reference optical spectrum trace of a reference signal which comprises a signal contribution that is spectrally representative of the signal contribution of the SUT and a noise contribution which is at least approximately known. The signal contribution is mathematically discriminated from said noise contribution in the SUT using the spectral shape trace and the test optical spectrum trace. The in-band noise parameter is then determined at least from the mathematically discriminated noise contribution.

In accordance with one embodiment, there is provided a method for determining an in-band noise parameter on an optical signal-under-test (SUT) propagating along an optical communication link and comprising a data-carrying signal contribution of any arbitrary degree of polarization and a noise contribution within an optical signal bandwidth, the method comprising: obtaining a test optical spectrum trace of said optical signal-under-test at a test point along said optical communication link, said test optical spectrum trace corresponding to a spectral range encompassing at least a portion of said optical signal bandwidth; obtaining a reference optical spectrum trace of a reference signal comprising a signal contribution spectrally representative of the signal contribution of said signal-under-test, and a noise contribution which is at least approximately known over said optical signal bandwidth; estimating a spectral shape trace of said signal contribution in said signal-under-test using said reference optical spectrum trace; mathematically discriminating said signal contribution from said noise contribution in said signal-under-test, within said optical signal bandwidth, using said spectral shape trace and said test optical spectrum trace; and determining said in-band noise parameter on said optical signal-under-test at least from the mathematically discriminated noise contribution.

In accordance with another embodiment, there is provided an apparatus for determining an in-band noise parameter on an optical signal-under-test (SUT) propagating along an optical communication link and comprising a data-carrying signal contribution of any arbitrary degree of polarization and a noise contribution within an optical signal bandwidth, the apparatus comprising: measurement means for obtaining a test optical spectrum trace of said optical signal-under-test at a test point along said optical communication link, said test optical spectrum trace corresponding to a spectral range encompassing at least a portion of said optical signal bandwidth; an input for receiving a reference optical spectrum trace of a reference signal comprising a signal contribution spectrally representative of the signal contribution of said signal-under-test, and a noise contribution which is at least approximately known over said optical signal bandwidth; processing unit for mathematically discriminating said signal contribution from said noise contribution in said signal-under-test, within said optical signal bandwidth, using said test optical spectrum trace and a spectral shape trace of said signal contribution in said signal-under-test estimated using said reference optical spectrum trace; and an inband noise determiner for determining said in-band noise parameter on said optical signal-under-test at least from the mathematically discriminated noise contribution.

In accordance with another embodiment, there is provided a method for determining the optical signal-to-noise ratio of an optical signal-under-test (SUT) propagating along an optical path. The SUT comprises at least one data-carrying signal contribution of any arbitrary degree of polarization and a noise contribution within an optical signal bandwidth. Spectral resolution means are employed to measure the spectrally-resolved optical SUT. The method comprises: obtaining a spectrally-resolved optical spectrum of the optical signal data from the optical signal-under-test, the data corresponding to wavelengths within a spectral range encompassing a significant portion of the optical signal bandwidth; obtaining, at a different point along the optical path, a different spectrally-resolved optical signal as a reference signal, the reference signal comprising the same data-carrying signal contribution, and the reference signal being characterized by a known optical signal-to-noise ratio; mathematically discriminating the at least one data-carrying signal contribution from the noise contribution within the optical signal bandwidth based on a mathematical comparison of the optical spectrum data with the reference optical spectrum data; determining an in-band noise level on the optical SUT from the discriminated noise contribution; and determining the optical signal-to-noise ratio from the determined in-band noise level, the optical signal-to-noise ratio being indicative of the noise contribution within the optical signal bandwidth.

In one embodiment, the in-band noise parameter that is being determined is the Optical Signal-to-Noise Ratio (OSNR), but other noise parameters that can also be determined include the in-band noise level, the Bit Error Rate (BER), the electrical signal-to-noise ratio, etc.

BRIEF DESCRIPTION OF THE DRAWINGS

It will be noted that throughout the appended drawings, like features are identified by like reference numerals.

DETAILED DESCRIPTION

Figure 1:
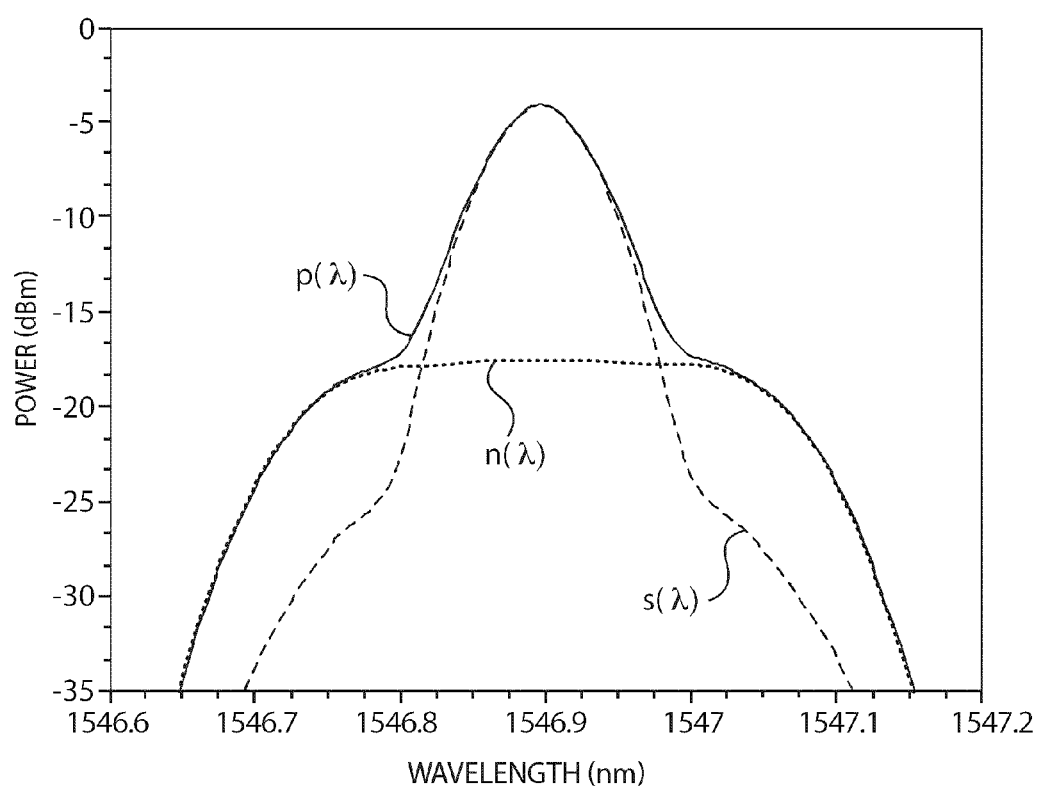
FIG. 1 is a graph illustrating the optical spectrum of an exemplary optical signal-under-test along with the optical spectrum of its noise contribution and of its signal contribution.

Now referring to FIG. 1, the methods and systems described herein relate to the characterization of an optical Signal-Under-Test (SUT) p which is used in optical telecommunications to transmit data over a Dense Wavelength Division Multiplexing (DWDM) optical channel. Throughout the present description, the optical signal p corresponds to one of the DWDM optical channels. In the optical channel bandwidth of interest, the optical signal p includes two components, i.e. a signal contribution s arising from the data-carrying signal, and a noise contribution n which includes all other sources of optical power within the optical channel. In the case of polarization-multiplexed communication, the signal contribution includes two distinct components of orthogonal polarizations. The noise contribution n arises mostly from the Amplified Spontaneous Emission (ASE) noise of the optical amplifiers in the optical transmission system. FIG. 1 shows the optical spectrum $p(\lambda)$ of an exemplary optical signal p, along with the optical spectrum of its signal contribution $s(\lambda)$ and the optical spectrum of its noise contribution $n(\lambda)$, such that:

$$p(\lambda)=s(\lambda)+n(\lambda)$$

An optical spectrum trace of the optical signal p can be acquired by an Optical Spectrum Analyzer (OSA) and represents the input optical signal p convolved with the filter spectral response of the OSA $h_{OSA}(\lambda)$ combined with any desired convolution window $h_W(\lambda)$. The optical spectrum trace $P(\lambda)$ is thus the spectrally-resolved optical power of the optical signal p. The optical spectrum trace $P(\lambda)$ also includes a signal contribution $S(\lambda)$ and a noise contribution $N(\lambda)$ which are merged together and appear as the optical spectrum trace $P(\lambda)$.

The methods and systems described herein are used to discriminate the signal contribution $S(\lambda)$ from the noise contribution $N(\lambda)$ in the optical spectrum trace $P(\lambda)$ of the SUT in order to determine the in-band noise on the SUT to be characterized. The instrument noise associated with the detection system itself, namely the OSA, on the acquired optical spectrum trace $P(\lambda)$ is considered to have a negligible effect compared to the optical noise contribution to be characterized.

FIG. 1 shows a single DWDM channel but it should be noted that according to wavelength division multiplexing a plurality of DWDM channels (not shown) appears on the optical communication spectrum. It should thus be kept in mind that other optical signals are typically present, spectrally on both sides of the optical signal p. Also, in the case of polarization-multiplexed networks, each DWDM channel includes two orthogonal polarization signals which, on an optical spectrum trace $P(\lambda)$ acquired by an OSA, will appear combined and undistinguishable as a single unpolarized signal.

The methods described herein rely on the fact that by knowing the shape $Sh(\lambda)$ of the signal contribution $S(\lambda)$ and assuming that the noise contribution $N(\lambda)$ is substantially uniform over the useful signal bandwidth, it is possible to mathematically discriminate the noise contribution from the signal contribution in that region. The shape of the signal contribution is obtained using a reference signal which has a known noise contribution over the signal bandwidth. These methods allow for the measurement of the OSNR of a SUT having any arbitrary degree of polarization (DOP).

Figure 2:
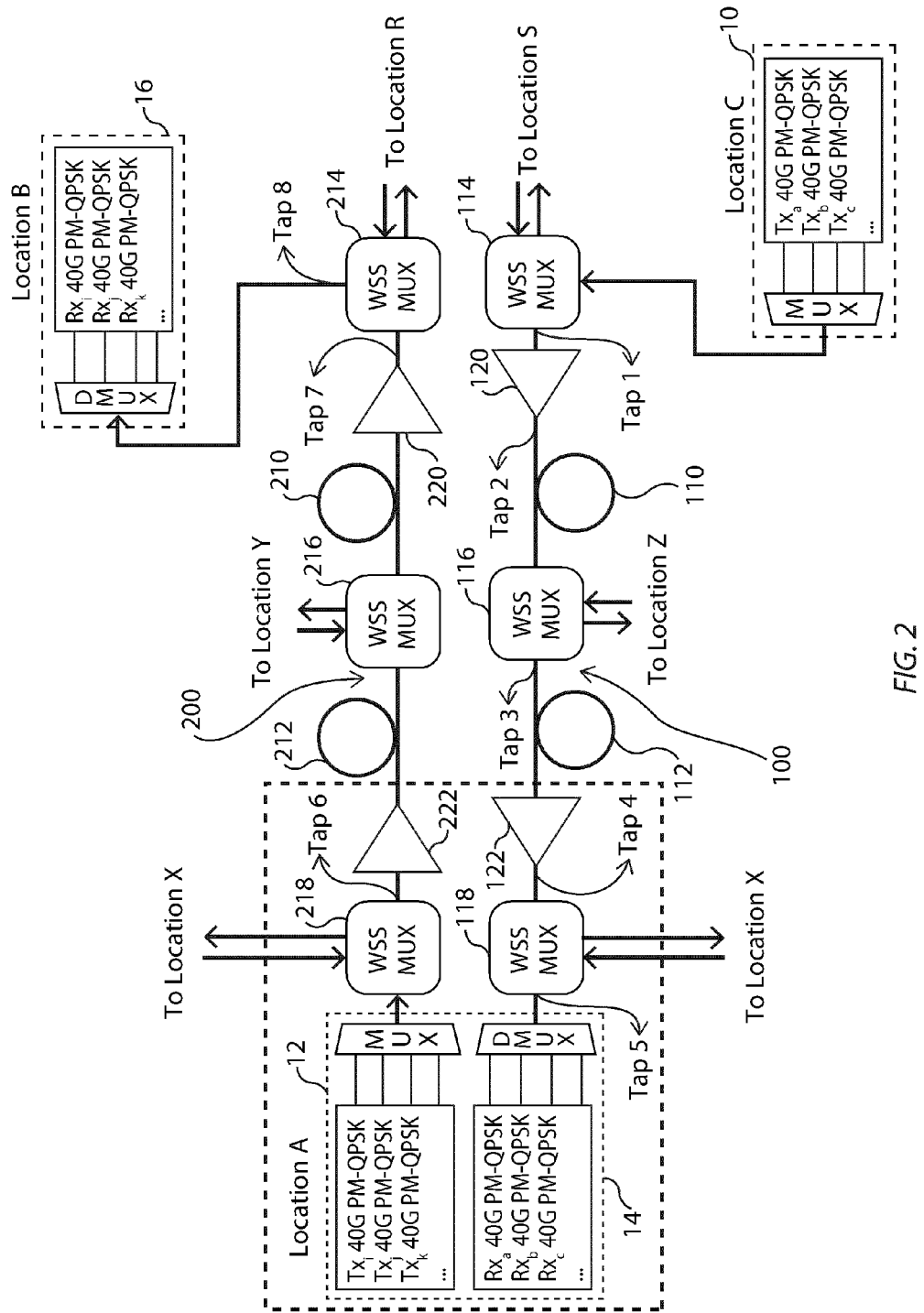
FIG. 2 is a schematic illustrating an example generic network scheme wherein an optical signal-under-test may be characterized using the methods described herein.
Figure 3A:
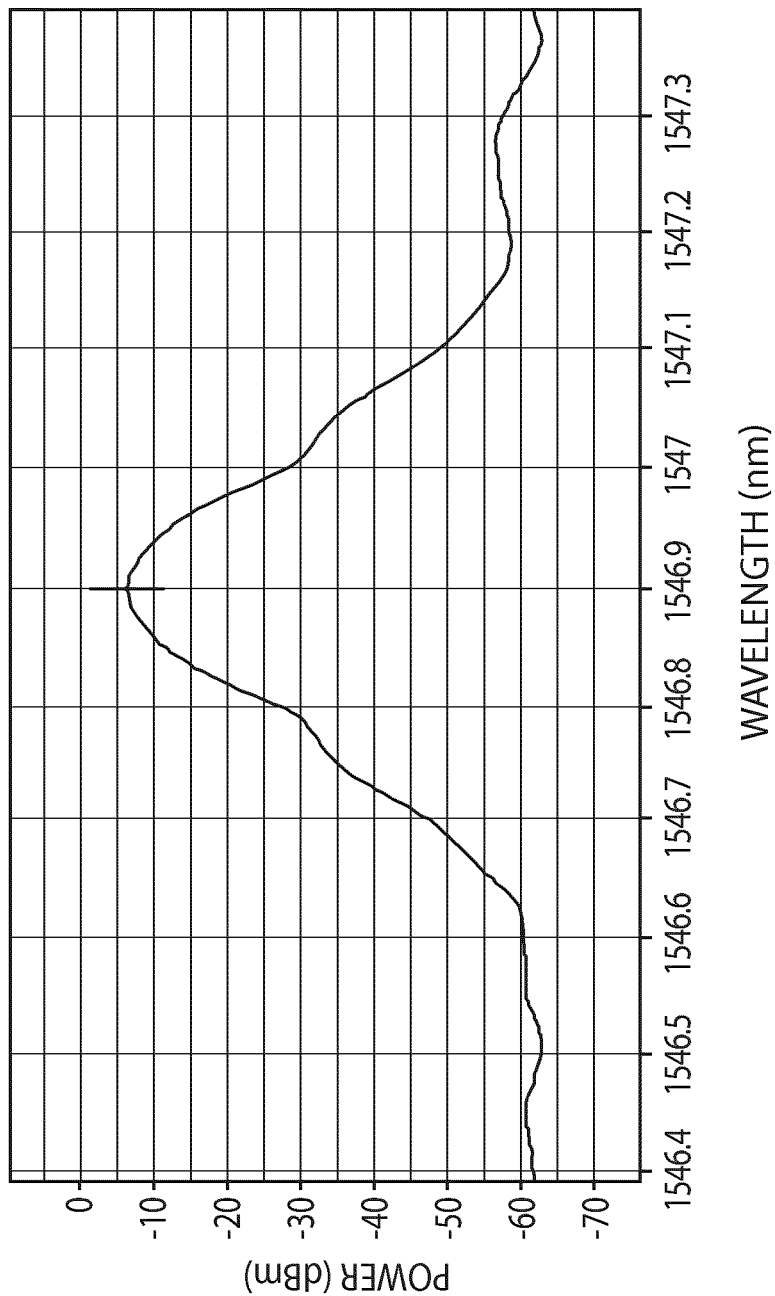
FIG. 3 comprises FIG. 3A, FIG. 3B, FIG. 3C and FIG. 3D which are graphs respectively showing the optical spectrum traces of SUTs at Tap 1, Tap 3, Tap 4 and Tap 5 of the network of FIG. 2.
Figure 3B:
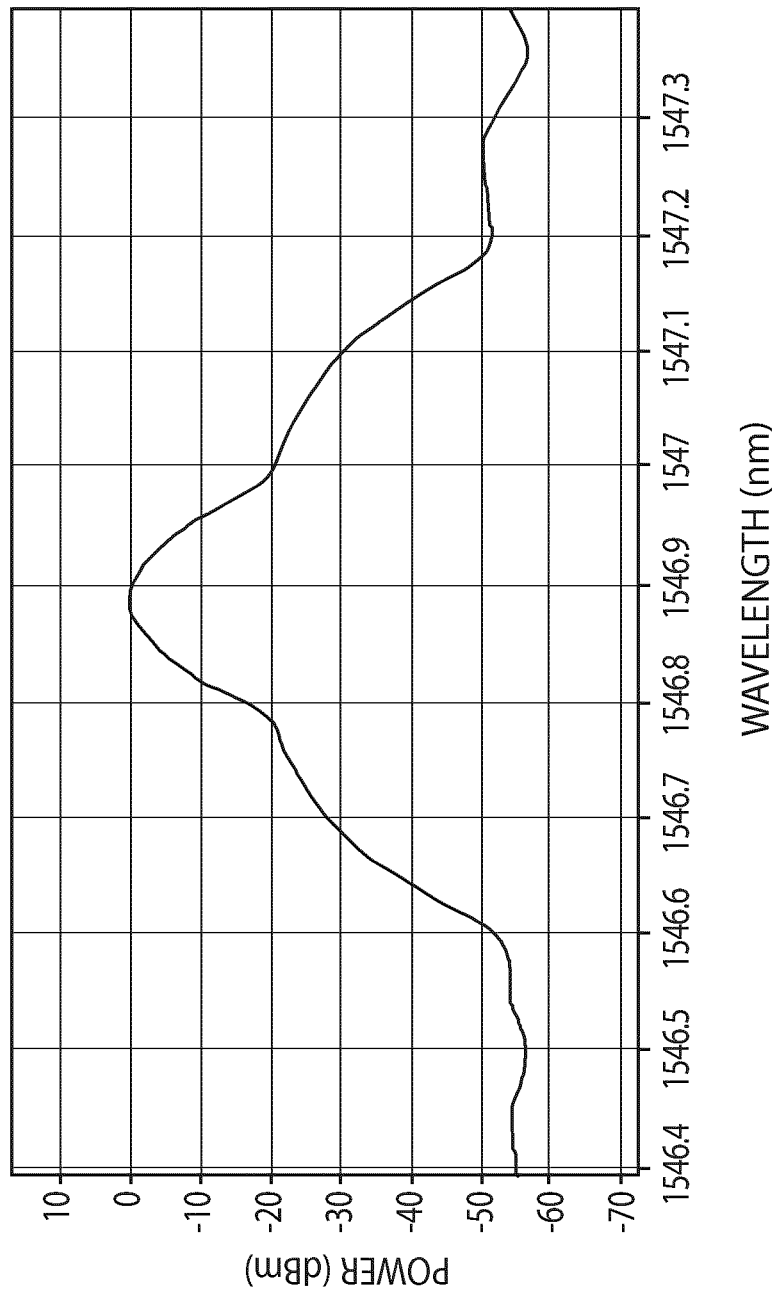
Figure 3C:
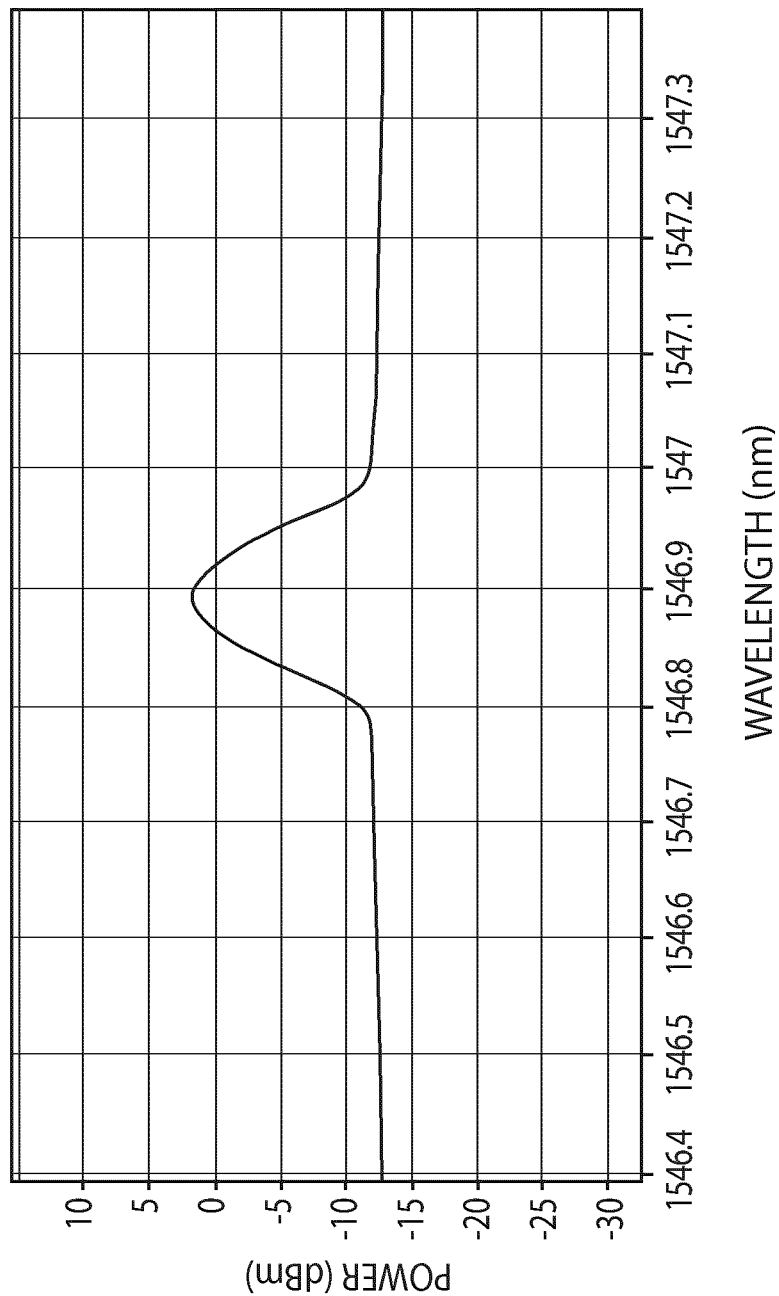
Figure 3D:
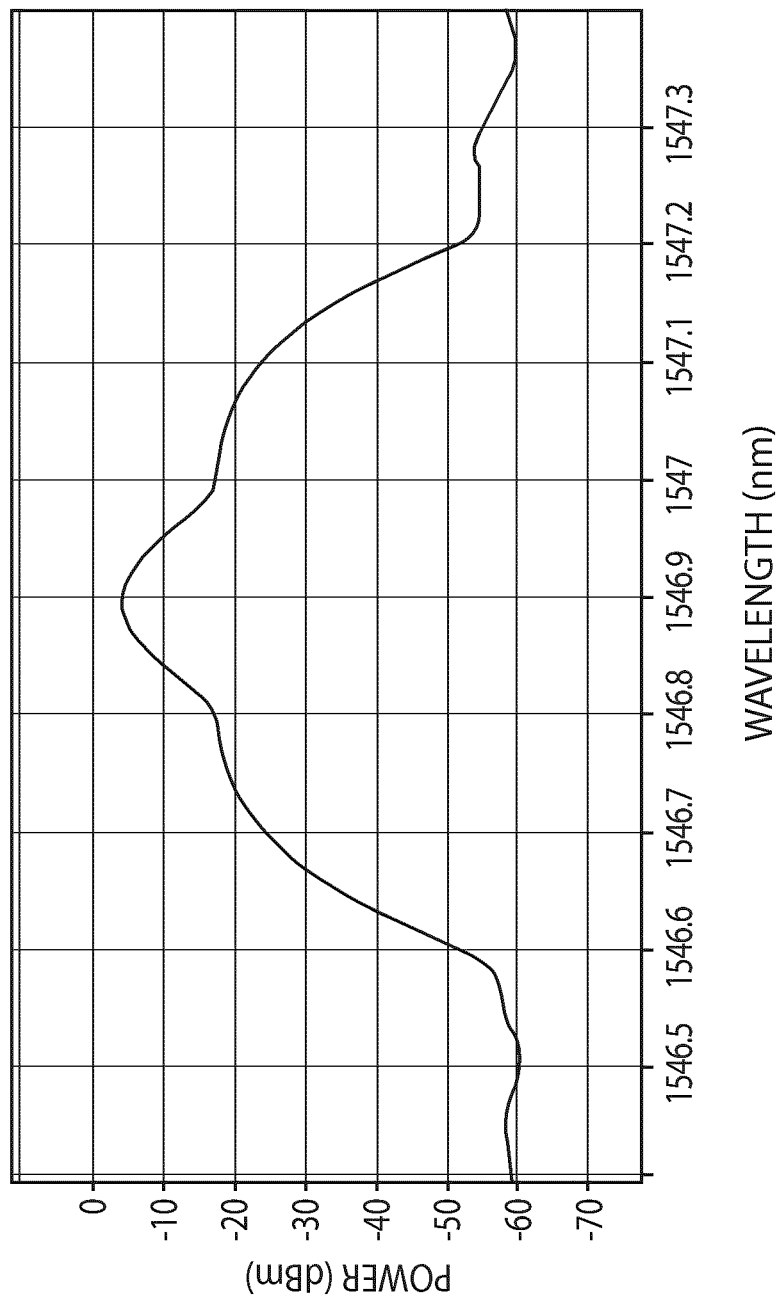

FIG. 2 shows an example of a generic network scheme wherein an optical signal-under-test may be characterized using the methods described herein. The network uses a 40G Polarization-Multiplexed Quadrature Phase-Shift Keying (PM-QPSK) modulation scheme and comprises a plurality of PM-QPSK transmitters 10, 12 and PM-QPSK receivers 14, 16 connected together through the network in order to transmit data between a plurality of nodes disposed at a plurality of distinct locations A, B, C, R, S, W, X, Y, Z. The network is shown in FIG. 2 with a first optical communication link 100 between transmitter 10 at location C and receiver 14 at location A, and a second optical communication link 200 between transmitter 12 at location A and receiver 16 at location B. Communication link 100 comprises optical fibers 110, 112, a plurality of multiplexers and demultiplexers such as Wavelength Selective Switch Multiplexers (WSS Mux) 114, 116, 118 and a plurality of optical amplifiers 120, 122 distributed along the communication link. Similarly, communication link 200 comprises optical fibers 210, 212, a plurality of multiplexers and demultiplexers such as WSS Mux 214, 216, 218 and a plurality of optical amplifiers 220, 222 distributed along the communication link. Monitoring tap ports (e.g. the 5% port of a 95/5 splitter), which are commonly available on network systems, are disposed along the communication link 100 (Tap 1, Tap 2, Tap 3, Tap 4, Tap 5) and along the communication link 200 (Tap 6, Tap 7, Tap 8,) to monitor the optical signals as they propagate along the communication link, using the methods described herein.

As mentioned herein above, the methods described herein provides for the characterization of the noise of a SUT taken anywhere along the communication links 100 and 200, using a reference signal which has a known noise contribution over the optical signal bandwidth. The SUT to be characterized may be the optical signal as appearing at Tap 2, Tap 3, Tap 4, Tap 5, Tap 7 or Tap 8 for example.

The optical spectrum trace of the SUT is generally obtained with measurement means capable of discriminating optical frequencies encompassed within the optical bandwidth of the SUT. Such measurements are typically obtained using a commercially available OSA such as, for example, that described in U.S. Pat. No. 6,636,306 et He et al. commonly owned by the Applicant and implemented in the FTB-5240 series of OSAs manufactured and sold by EXFO Inc. The methods described herein may also be implemented within such an instrument.

FIGS. 3A, 3B, 3C and 3D respectively show optical spectrum traces as would be acquired on Tap 1, Tap 3, Tap 4 and Tap 5.

In one embodiment, the signal to be characterized is the one appearing at Tap 5 for example. An optical spectrum trace of the SUT is obtained using an OSA connected at Tap 5 and the reference signal is taken at Tap 1, which is at another location along communication link 100 where the optical signal originates from the same transmitter 10 and where the signal can be assumed to be free of ASE noise considering that the signal at Tap 1 has not passed through any optical amplifier. In order to acquire the optical spectrum trace of the reference signal, a technician would generally have to physically go to a different location on the network, for example to Location C.

Considering that the spectral shape of the signal does not significantly change along the communication link, the signal contribution of such a reference signal is spectrally representative of the signal contribution of the SUT in the spectral region of interest. Of course, within the optical signal bandwidth, the spectral shape of the signal propagating in the communication link may slightly change, due to non-linear effects for example, but such change is considered non significant if it does not introduce any non tolerable error on the characterization of noise of the SUT in accordance with the methods described herein. It is noted that spectral shape variations due to non-linear effects are generally not perceptible on optical spectrum traces acquired by grating-based OSAs. Also, the spectral shape of the signal may change along the communication link due to filtering caused by multiplexing and demultiplexing devices. However, generally, such filtering does not significantly affect the shape of the signal over the optical signal bandwidth of interest herein.

Signals appearing at Tap 3, Tap 4 or Tap 5 may also be characterized similarly using the signal at Tap 1 as the reference signal.

If the OSNR is happened to be known anywhere else on communication link 100, such as on Tap 2 or Tap 3 for example, a reference signal may then be taken at that point instead. It is noted that the OSNR of the reference signal does not need to be higher than the OSNR of the SUT to be characterized. It only needs to be known.

In another embodiment, the SUT to be characterized is the signal as appearing at Tap 4 or Tap 5 on communication link 100. The technician therefore goes to location A to acquire an optical spectrum trace of the SUT at Tap 4 or Tap 5. One should note that the signal appearing on Tap 6 of communication link 200 which is generated using optical transmitter 12 of the same type as the optical transmitter 10, has a signal contribution that is spectrally representative of the signal contribution of the SUT and has a known noise contribution which may be assumed negligible. This signal can therefore be used as a reference signal. The optical spectrum traces of the SUT and of the reference signal can in this manner be both obtained at the same location, i.e. location A, which eliminates the need for having the technician to travel to a different location to acquire the reference trace.

It should be appreciated that, if the spectral distribution of the reference signal is a priori known or can be reliably assumed, actual measurement of the reference via the tap couplers is not necessarily required.

Figure 4:
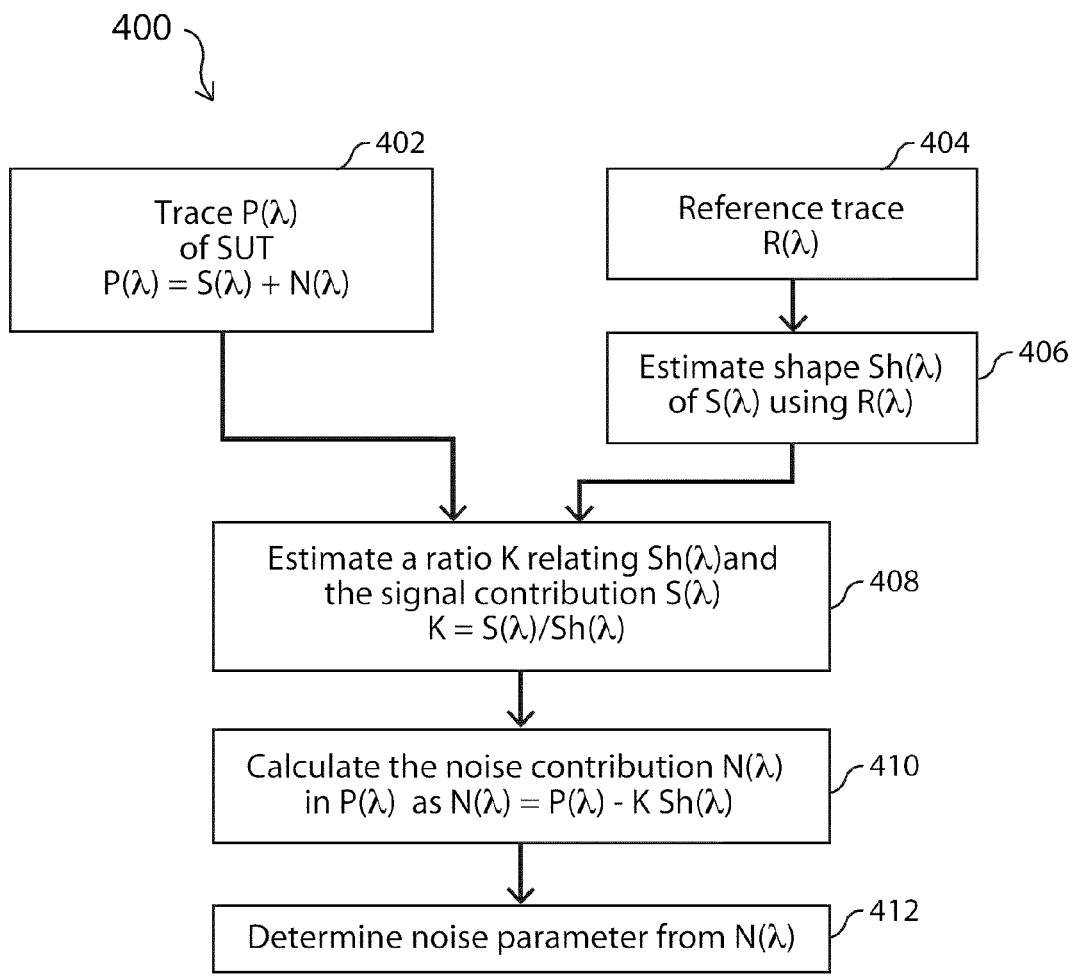
FIG. 4 is a flowchart illustrating a method for determining an in-band noise parameter on a SUT in accordance with one embodiment.

FIG. 4 illustrates a method 400 for determining the OSNR or any other in-band noise parameter on a SUT in accordance with one embodiment.

In step 402, an optical spectrum trace $P(\lambda)$ of the SUT to be characterized is obtained. As mentioned above, in one embodiment, trace $P(\lambda)$ is acquired using an OSA at the monitoring tap port corresponding to the position on the network where the in-band noise is to be characterized. For example, trace $P(\lambda)$ may be acquired at Tap 2, Tap 3, Tap 4 or Tap 5 of the network of FIG. 2. It is noted that in order to determine the OSNR and other in-band noise parameters, a relative spectral power distribution of the SUT is sufficient. There is therefore no need for trace $P(\lambda)$ to be referenced in absolute value. Trace $P(\lambda)$ comprises a data-carrying signal contribution $S(\lambda)$ or any arbitrary degree of polarization and a noise contribution $N(\lambda)$ within the optical signal bandwidth of the SUT such that:

$$P(\lambda)=S(\lambda)+N(\lambda)$$

In step 404, a reference optical spectrum trace $R(\lambda)$ is obtained. The reference signal has a signal contribution $S_r(\lambda)$ which is representative of the shape $Sh(\lambda)$ of the signal contribution $S(\lambda)$ of the SUT, and has a noise contribution $N_r(\lambda)$ which is at least approximately known over the optical signal bandwidth. As mentioned above, reference trace $R(\lambda)$ may be acquired, for example, at Tap 1 of the network of FIG. 2. In this specific case, the noise contribution $N_r(\lambda)$ may be considered negligible and is therefore known. If reference trace $R(\lambda)$ is acquired at Tap 6 for example, the noise contribution $N_r(\lambda)$ may also be considered negligible. As explained above, reference trace $R(\lambda)$ may also be acquired at a position along a communication link where the noise contribution is not negligible but is either theoretically known or has been previously characterized. Other reference traces $R(\lambda)$ may also be used. In steps 406, 408 and 410, the signal contribution $S(\lambda)$ and the noise contribution $N(\lambda)$ of the SUT are mathematically discriminated from one another over the optical signal bandwidth using a mathematical comparison of traces $R(\lambda)$ and $T(\lambda)$.

More particularly, in step 406, the spectral shape $Sh(\lambda)$ of the signal contribution $S(\lambda)$ is estimated using reference trace $R(\lambda)$. In embodiments where the noise contribution $N_r(\lambda)$ is considered negligible, the shape $Sh(\lambda)$ may be simply obtained as directly corresponding to reference trace $R(\lambda)$:

$$Sh(\lambda)=R(\lambda)$$

In other embodiments where the noise contribution $N_r(\lambda)$ has a known finite value, the shape $Sh(\lambda)$ may be obtained by subtracting the known noise contribution from reference trace $R(\lambda)$.

In step 408, a ratio K which is defined as the ratio between the trace of the signal contribution $S(\lambda)$ and the trace of the shape $Sh(\lambda)$ ($K=S(\lambda)/Sh(\lambda)$) is estimated. For example, in one embodiment, the ratio K is estimated at the peak wavelength of trace $P(\lambda)$ of the SUT:

$$K=P(\lambda_{pk})/Sh(\lambda_{pk})$$

Other methods for estimating the ratio K will be described herein below.

In step 410, the noise contribution $N(\lambda)$ of the SUT is calculated using the ratio K, for example as follows:

$$N(\lambda)=P(\lambda)-K\cdot Sh(\lambda)$$

In step 412, the OSNR or any other in-band noise parameter characterizing the SUT is determined using the discriminated noise contribution $N(\lambda)$.

It is noted that even if the noise contribution $N_r(\lambda)$ of the reference trace is not considered negligible, the shape $Sh(\lambda)$ may also be estimated as directly corresponding to reference trace $R(\lambda)$ and, as will be described in more detail below, the noise contribution $N(\lambda)$ be corrected at step 410 for the presence of non-negligible noise in the reference trace.

It is also noted that the noise contribution $N_r(\lambda)$ is typically considered negligible when the OSNR of the reference signal is significantly higher than that of the SUT. The presence of a noise contribution $N_r(\lambda)$ will simply result in an error on the estimated noise parameter to be characterized. The level of acceptable noise $N_r(\lambda)$ hence depends on the level of acceptable error on the noise parameter to be characterized. For example, assuming a negligible noise on a reference signal having an OSNR 10 dB higher than that of the SUT will result in a 0.5-dB systematic error on an OSNR estimation of the SUT.

The method of FIG. 4 is directly applicable to OSNR determination of polarization-multiplexed signals, but is also applicable to cases where the State Of Polarization (SOP) of the SUT is scrambled at rates much greater than the analog detection bandwidth of the spectral resolution means, e.g. the OSA that is being used for the acquisition, and is thus seen as highly depolarized. It is also applicable to polarized signals as well, as a complement to polarization-based techniques of the prior art when the performances of these techniques are limited by the presence of high impairments, such as strong polarization mode dispersion (PMD) for example, or as an alternate technique which does not require polarization analysis and detection.

Details as to how the reference trace may be processed to obtain the ratio K are now described and illustrated using a SUT that is a DQPSK polarization-multiplexed signal carrying 40 Gbit/s data and with an effective spectral bandwidth larger than 10 GHz. The technique is illustrated with a few different OSNR levels to show the performance and limitation of the approach thus applied. It should be noted that the method may require further processing when the signal contribution of the SUT is spectrally modified between the reference signal and the SUT, after passing through multiple cascaded filters of narrow bandwidth compared to the optical signal bandwidth. In the following examples, the proposed method relies on a reference signal that is taken at a different physical position in the network or generated relying on knowledge of the signal transmission at the source of the SUT. The method is illustrated by way of examples which use a series of actual results obtained from a simulated system that corresponds to the configuration illustrated in FIG. 2. It should be easily appreciated that, although the processes described below rely on equations where the noise and signal levels are used, these equations can be reformulated to use the OSNR levels (i.e. a dimensionless signal-to-noise ratios) in order to achieve a similar mathematical processing.

FIGS. 3A, 3B, 3C and 3D respectively show optical spectrum traces as obtained on Tap 1, Tap 3, Tap 4 and Tap 5 of the simulated network of FIG. 2.

Using the spectral trace $R(\lambda)$ acquired at Tap 1 as the reference-signal trace, the OSNR at all other tap positions in the optical communication link 100 can be determined. To demonstrate the method, various approaches are applied. The following examples show embodiments of processing algorithms that can be used to mathematically discriminate the noise and the signal contributions. The examples are applied to the SUT having the highest OSNR, i.e. at Tap 3, which is typically the most difficult to measure. At this position, the expected noise level is −23.6 dBm for an OSNR of 22.8 dB in a 0.1-nm resolution bandwidth.

EXAMPLE 1

Figure 5:
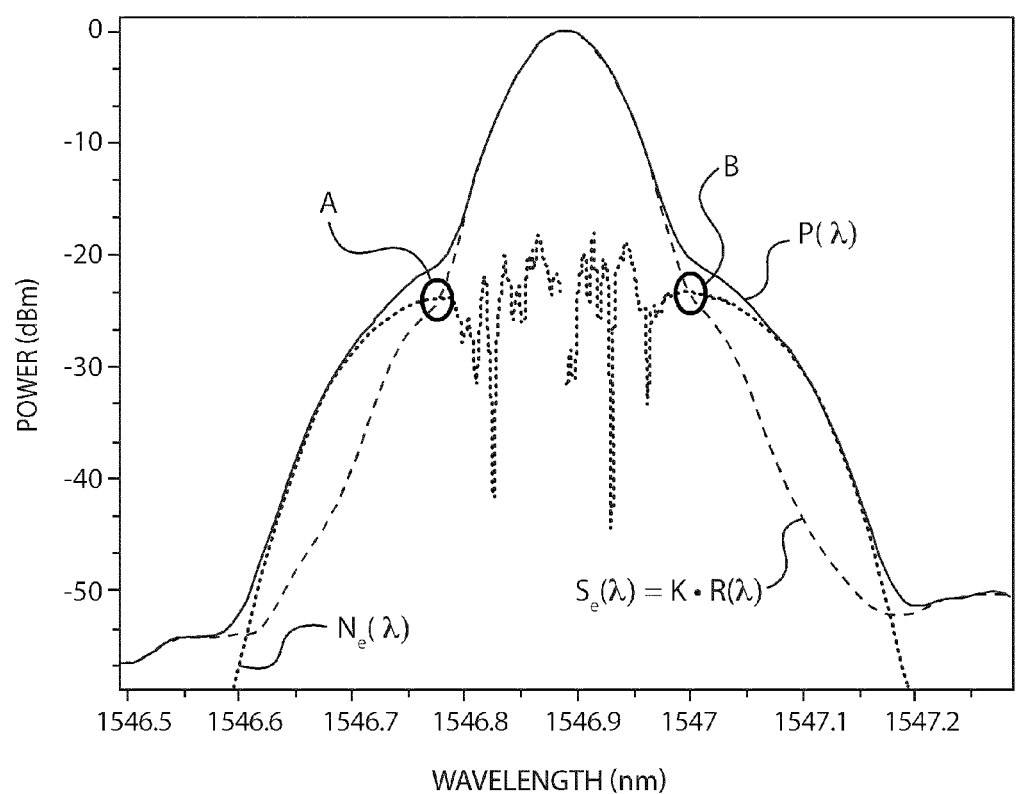
FIG. 5 is a graph illustrating the result of example 1 of a processing algorithm used to estimate the noise contribution on the SUT obtained at Tap 3 of FIG. 2, using a reference trace obtained at Tap 1 of FIG. 2.

FIG. 5 illustrates an embodiment of a processing algorithm used to estimate the noise contribution on the trace $P(\lambda)$ of the SUT obtained at Tap 3, using the reference trace $R(\lambda)$ obtained at Tap 1. The processing algorithm is based on the method of FIG. 4. In this example case, the spectral shape $Sh(\lambda)$ corresponds to the reference trace $R(\lambda)$ (step 406). The ratio K is estimated by calculating the ratio between the maximum value of trace $P(\lambda)$ and the maximum value of the reference trace $R(\lambda)$ (step 408):

$$K=\max(P(\lambda))/\max(R(\lambda))$$

In this case, K=4.426. The spectrally-resolved trace of the signal contribution and the noise contribution of the SUT are respectively the estimated as follows (step 410):

$$S_e(\lambda)=K\cdot R(\lambda)$$

$$N_e(\lambda)=P(\lambda)-K\cdot R(\lambda)$$

In is noted that because this estimation of K assumes a negligible noise contribution on trace $P(\lambda)$ of the SUT at the peak wavelength, the estimation of the noise contribution $N_e(\lambda)$ cannot be valid at wavelengths in the vicinity of the peak wavelength. By assuming a uniform in-band noise within the optical signal bandwidth, the in-band noise may then estimated, for example, at the cross-over wavelengths (circled areas A and B) of the estimated signal contribution $S_e(\lambda)$ and noise contribution $N_e(\lambda)$. In this case, a noise of −23.6 dBm is obtained (in the resolution bandwidth corresponding to the acquisition), for an OSNR of 3.53 dBm−(−23.6 dBm)=27.13 dB (or 22.8 dB in a 0.1-nm resolution bandwidth) (step 412).

This processing algorithm may be modified for cases where the reference signal has a known finite OSNR. As explained above, in one embodiment, the shape $Sh(\lambda)$ is obtained by subtracting the known noise contribution value from the reference trace $R(\lambda)$. However, in another embodiment, the reference trace $R(\lambda)$ is used as is as the spectral shape $Sh(\lambda)$ but the in-band noise value obtained from the above processing algorithm is corrected by adding a correction term K*(known noise contribution value on reference trace $R(\lambda)$), so as to obtain a value of the in-band noise of the SUT as if the reference was devoid of noise.

EXAMPLE 2

It is noted that this processing algorithm does not necessarily require a spectral-resolved point-by-point analysis. In a second example embodiment, data is obtained at three different resolution bandwidths, for example the "physical resolution" of the OSA, a 0.1-nm resolution bandwidth and a 0.2-nm resolution bandwidth.

This example also assumes a negligible noise contribution on the reference signal such that $Sh(\lambda)=R(\lambda)$ (step 406).

The process is then as follows:

The reference trace $R(\lambda)$ is acquired (in this example, at Tap 1) and the peak power $R(\lambda pk)$ is determined.

A second $R_{0.1}(\lambda)$ and a third $R_{0.2}(\lambda)$ reference traces are obtained either by performing additional acquisitions of the reference signal using respectively a first and a second resolution bandwidth RBW1, RBW2, e.g. 0.1-nm and 0.2-nm resolution bandwidths in this case, or by integrating trace $R(\lambda)$ in software. The peak powers of these traces $R_{0.1}(\lambda pk)$, $R_{0.2}(\lambda pk)$ are then determined.

The trace $P(\lambda)$ of the SUT is acquired (in this example, at Tap 3) and the peak power $P(\lambda pk)$ is determined.

A second $P_{0.1}(\lambda)$ and a third $P_{0.2}(\lambda)$ traces of the SUT are obtained again either by performing additional acquisitions of the reference signal using respectively the first and the second resolution bandwidth or by integrating trace $P(\lambda)$ in software, and the peak powers of these traces $P_{0.1}(\lambda pk)$, $P_{0.2}(\lambda pk)$ are determined.

The ratio K is estimated similarly as above (step 408):

$$K=P(\lambda pk)/R(\lambda pk)$$

Then, assuming a uniform noise distribution within the optical signal bandwidth, it can be assumed that the noise contribution $N_{0.1}(\lambda pk)$ in trace $P_{0.1}(\lambda)$ can be related to the noise contribution $N_{0.2}(\lambda pk)$ in trace $P_{0.2}(\lambda)$ as follows:

$$\frac{N_{0.2}(\lambda pk)}{N_{0.1}(\lambda pk)} = \frac{RBW2}{RBW1} = \frac{0.2 \text{ nm}}{0.1 \text{ nm}}$$

Therefore, noise contribution on a 0.1-nm resolution bandwidth can be calculated (step 410) as follows:

$$P_{0.2}(\lambda pk)-K^*R_{0.2}(\lambda pk)-[P_{0.1}(\lambda pk)-K^* R_{0.1}(\lambda pk)]=N_{0.2}(\lambda pk)-N_{0.1}(\lambda pk)=RWB2/RBW1\times N_{0.1}(\lambda pk)-N_{0.1}(\lambda pk)=N_{0.1}(\lambda pk)$$

In the specific case of the measurement on Tap 3 using Tap 1 as the reference signal, a noise of −24.12 dBm is obtained (in the resolution bandwidth corresponding to the acquisition), for an OSNR of 3.53 dBm−(−24.12 dBm)=27.65 dB (or 23.2 dB in a 0.1-nm resolution bandwidth) (step 412).

It is noted that this processing algorithm can be modified to use different values of resolution bandwidths.

EXAMPLE 3

Figure 6:
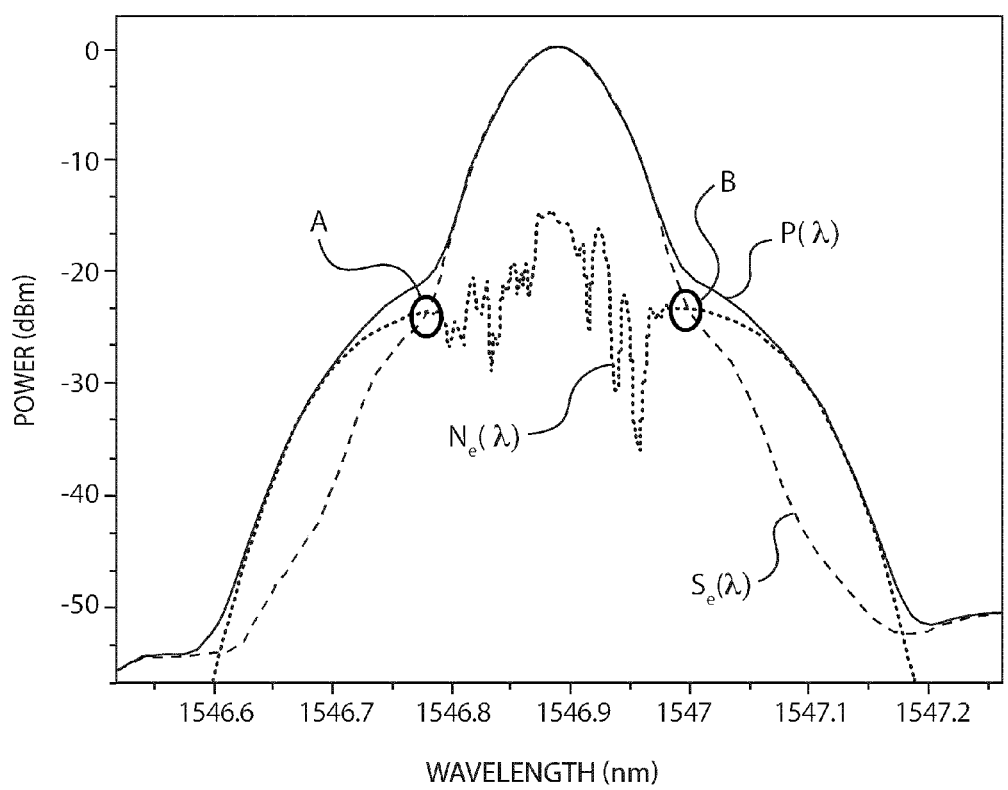
FIG. 6 is a graph illustrating the result of example 3 of a processing algorithm used to estimate the noise contribution on the SUT obtained at Tap 3 of FIG. 2, using a reference trace obtained at Tap 1 of FIG. 2.

FIG. 6 illustrates another embodiment of a processing algorithm used to estimate the noise contribution on the trace $P(\lambda)$ of the SUT obtained at Tap 3, using the reference trace $R(\lambda)$ obtained at Tap 1. The processing algorithm is based on the method of example 1 but uses a different processing algorithm to estimate the ratio K.

This example also assumes a negligible noise contribution on the reference signal such that $Sh(\lambda)=R(\lambda)$ (step 406).

This processing algorithm is made using measurements made at two distinct wavelengths $\lambda 1$ and $\lambda 2$ that are within the optical signal bandwidth of the SUT and generally positioned on the same side of the peak of the SUT. By assuming a uniform noise distribution within the optical signal bandwidth and therefore a substantially equal noise level at $\lambda 1$ and $\lambda 2$ on the trace $P(\lambda)$ and trace $R(\lambda)$, we find:

$$P(\lambda 2) - P(\lambda 1) = S(\lambda 2) - S(\lambda 1)$$
$$= S(\lambda 1)\left(\frac{S(\lambda 2)}{S(\lambda 1)} - 1\right)$$
$$= S(\lambda 1)\left(\frac{R(\lambda 2)}{R(\lambda 1)} - 1\right)$$
$$= \frac{S(\lambda 1)}{R(\lambda 1)}(R(\lambda 2) - R(\lambda 1))$$

and the ratio K is then estimated in the region around $\lambda 1$ and $\lambda 2$ (step 408) as follows:

$$\frac{S(\lambda 1)}{R(\lambda 1)} = K = \frac{P(\lambda 2) - P(\lambda 1)}{R(\lambda 2) - R(\lambda 1)}$$

Which yields in this case K=4.384. The spectrally-resolved trace of the signal contribution and the noise contribution of the SUT may then respectively be estimated (step 410) as follows:

$$S_e(\lambda)=K \cdot R(\lambda)$$

$$N_e(\lambda)=P(\lambda)-K \cdot R(\lambda)$$

As in example 1, the in-band noise may then be estimated, for example, at the cross-over wavelengths (circled areas A and B) of the estimated signal contribution $S_e(\lambda)$ and noise contribution $N_e(\lambda)$. In this case, a noise of −23.47 dBm is obtained (in the resolution bandwidth corresponding to the acquisition), for an OSNR of 3.53 dBm−(−23.47 dBm)=27.0 dB (or 22.6 dB in a 0.1-nm resolution bandwidth) (step 412).

It is noted that this processing algorithm can be adapted easily to specific conditions. For example, K may be determined from different spectral regions that are selected based on the measured optical signal bandwidth.

EXAMPLE 4

Example 4 illustrates yet another embodiment of a processing algorithm used to estimate the noise contribution on the trace $P(\lambda)$ of the SUT obtained at Tap 3, using the reference trace $R(\lambda)$ obtained at Tap 1.

In this example, it is not necessary to assume a negligible noise contribution on the reference signal. This approach can be viewed as another way of calculating the ratio K (step 408), which is made over a larger area compared to examples 1, 2 and 3. It can thus be viewed as a spectral averaging on the data.

The reference trace $R(\lambda)$ is acquired (in this example, at Tap 1).

Similarly to example 2, a second $R_{0.1}(\lambda)$ and a third $R_{0.2}(\lambda)$ reference traces are obtained either by performing additional acquisitions of the reference signal using respectively a first and a second resolution bandwidth RBW1, RBW2, e.g. 0.1-nm and 0.2-nm resolution bandwidths in this case, or by integrating trace $R(\lambda)$ in software, and the peak powers of these traces $R_{0.1}(\lambda pk)$, $R_{0.2}(\lambda pk)$ are determined.

The trace $P(\lambda)$ of the SUT is acquired (in this example, at Tap 3).

A second $P_{0.1}(\lambda)$ and a third $P_{0.2}(\lambda)$ traces of the SUT are obtained again either by performing additional acquisitions of the reference signal using respectively the first and the second resolution bandwidth or by integrating trace $P(\lambda)$ in software, and the peak powers of these traces $P_{0.1}(\lambda pk)$, $P_{0.2}(\lambda pk)$ are determined.

Then, assuming a uniform noise distribution within the optical signal bandwidth, it can be assumed that the noise contribution $N_{0.1}(\lambda pk)$ in trace $P_{0.1}(\lambda)$ can be related to the noise contribution $N_{0.2}(\lambda pk)$ in trace $P_{0.2}(\lambda)$ as follows:

$$\frac{N_{0.2}(\lambda pk)}{N_{0.1}(\lambda pk)} = \frac{RBW2}{RBW1} = \frac{0.2 \text{ nm}}{0.1 \text{ nm}}$$

And we obtain:

$$\frac{0.2}{0.1} P_{0.1}(\lambda pk) - P_{0.2}(\lambda pk) = \frac{0.2}{0.1} S_{0.1}(\lambda pk) + \frac{0.2}{0.1} N_{0.1}(\lambda pk) - S_{0.2}(\lambda pk) - N_{0.2}(\lambda pk)$$

$$\frac{0.2}{0.1} P_{0.1}(\lambda pk) - P_{0.2}(\lambda pk) = \frac{0.2}{0.1} S_{0.1}(\lambda pk) - S_{0.2}(\lambda pk)$$

and $$\frac{0.2}{0.1} R_{0.1}(\lambda pk) - R_{0.2}(\lambda pk) = \frac{0.2}{0.1} \frac{S_{0.1}(\lambda pk)}{K} + \frac{0.2}{0.1} Nref_{0.1}(\lambda pk) - \frac{S_{0.2}(\lambda pk)}{K} - Nref_{0.2}(\lambda pk)$$

$$\frac{0.2}{0.1} R_{0.1}(\lambda pk) - R_{0.2}(\lambda pk) = \frac{1}{K}\left[\frac{0.2}{0.1} S_{0.1}(\lambda pk) - S_{0.2}(\lambda pk)\right]$$

where $Nref_{0.1}(\lambda)$ and $Nref_{0.2}(\lambda)$ are the noise contributions in reference traces $R_{0.1}(\lambda)$ and $R_{0.2}(\lambda)$ respectively.

From the above, we obtain that K may be estimated (step 408) as follows:

$$K = \frac{\frac{0.2}{0.1} P_{0.1}(\lambda pk) - P_{0.2}(\lambda pk)}{\frac{0.2}{0.1} R_{0.1}(\lambda pk) - R_{0.2}(\lambda pk)}$$

The noise contributions on 0.1-nm and 0.2-nm resolution bandwidths can then be respectively calculated (step 410) as follows:

$$N_{0.1}(\lambda pk) = P_{0.1}(\lambda pk) - K \cdot R_{0.1}(\lambda pk)$$

$$N_{0.2}(\lambda pk) = P_{0.2}(\lambda pk) - K \cdot R_{0.2}(\lambda pk)$$

In the specific case of the measurement on Tap 3 using Tap 1 as the reference signal, we obtain a ratio K of 4.3586. The in-band noise can then be estimated as explained above and the OSNR determined (step 412).

EXAMPLE 5

Figure 7:
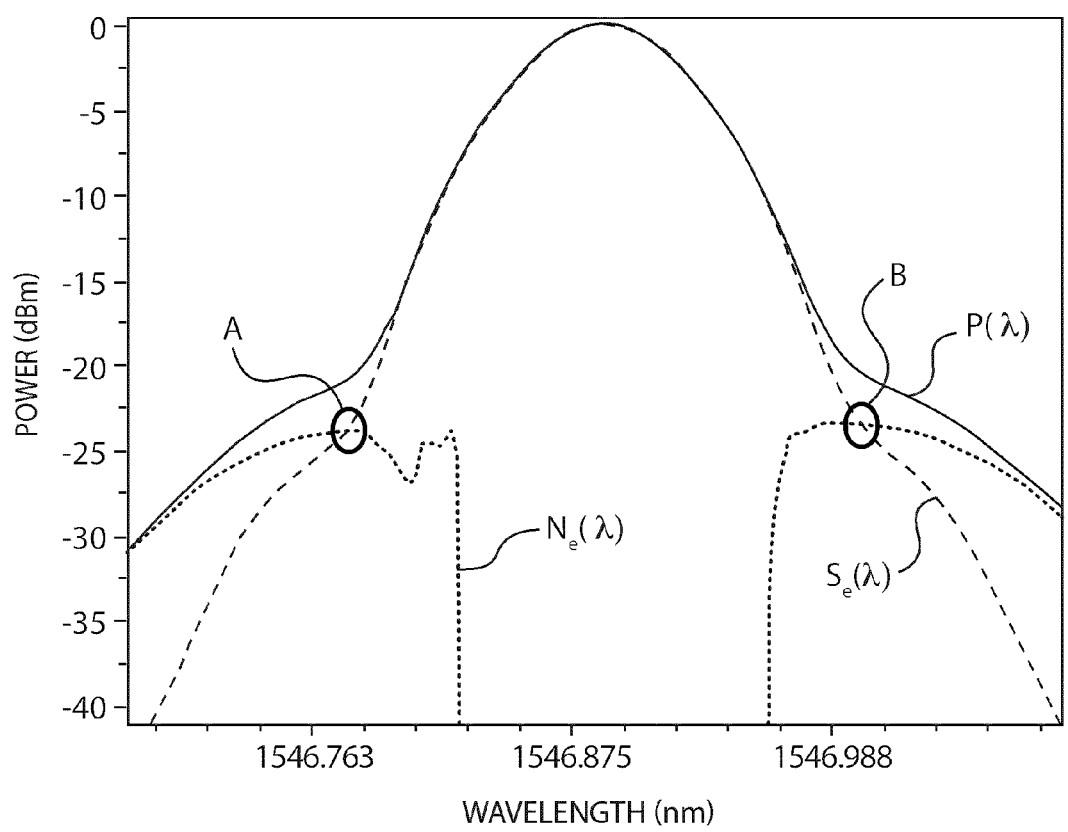
FIG. 7 is a graph illustrating the result of example 5 of a processing algorithm used to estimate the noise contribution on the SUT obtained at Tap 3 of FIG. 2, using a reference trace obtained at Tap 1 of FIG. 2.

FIG. 7 illustrates another embodiment of a processing algorithm used to estimate the noise contribution on the trace $P(\lambda)$ of the SUT obtained at Tap 3, using the reference trace $R(\lambda)$ obtained at Tap 1.

Using different traces obtained with varied resolution bandwidths, the shape of the reference signal can be used to determine the noise contribution in the SUT. This example processing algorithm is based on the difference in accrual of the reference trace with increasing resolution bandwidth, compared to the accrual of the trace of the SUT, this difference in accrual being generally attributable to the noise contribution in the SUT.

The process steps are as follows:

The reference trace $R(\lambda)$ is acquired (in this example, at Tap 1) and the peak power $R(\lambda pk)$ is determined.

A second $R_{0.1}(\lambda)$ and a third $R_{0.2}(\lambda)$ reference traces are obtained either by performing additional acquisitions of the reference signal using respectively a first and a second resolution bandwidth RBW1, RBW2, e.g. 0.1-nm and 0.2-nm resolution bandwidths in this case, or by integrating trace $R(\lambda)$ in software, and the peak powers of these traces $R_{0.1}(\lambda pk)$, $R_{0.2}(\lambda pk)$ are determined.

The trace $P(\lambda)$ of the SUT is acquired (in this example, at Tap 3) and the peak power $P(\lambda pk)$ is determined.

A second $P_{0.1}(\lambda)$ and a third $P_{0.2}(\lambda)$ traces of the SUT are obtained again either by performing additional acquisitions of the reference signal using respectively the first and the second resolution bandwidth or by integrating trace $P(\lambda)$ in software, and the peak powers of these traces $P_{0.1}(\lambda pk)$, $P_{0.2}(\lambda pk)$ are determined.

One may define a as the ratio $S_{0.2}(\lambda pk)/S_{0.1}(\lambda pk)$ which, assuming a negligible noise contribution on the reference signal, can be obtained as follows:

$$\frac{R_{0.2}(\lambda pk)}{R_{0.1}(\lambda pk)} - \frac{K \cdot S_{0.2}(\lambda pk)}{K \cdot S_{0.1}(\lambda pk)} = \alpha$$

And we obtain:

$$P_{0.2}(\lambda) - \alpha P_{0.1}(\lambda) = S_{0.2}(\lambda) - \alpha S_{0.1}(\lambda) + N_{0.2}(\lambda) - \alpha N_{0.1}(\lambda)$$

$$= N_{0.2}(\lambda) - \alpha N_{0.1}(\lambda)$$

$$= \frac{RBW2}{RBW1} N_{0.1}(\lambda) - \alpha N_{0.1}(\lambda)$$

In this example, the ratio $\alpha$ effectively replaces the ratio K used in the other examples (step 408).

The noise contribution on a 0.1-nm resolution bandwidth may then be estimated as follows:

$$N_{0.1}(\lambda) = \frac{P_{0.2}(\lambda) - \alpha P_{0.1}(\lambda)}{\frac{RBW2}{RBW1} - \alpha}$$

Again, the in-band noise may then be estimated, for example, at the cross-over wavelengths (circled areas A and B) of the estimated signal contribution $S_e(\lambda)$ and noise contribution $N_e(\lambda)$. In this case, a noise of −23.59 dBm is obtained (in the resolution bandwidth corresponding to the acquisition) for an OSNR of 3.53 dBm−(−23.59 dBm)=27.12 dB (or 22.7 dB in a 0.1-nm resolution bandwidth) (step 412).

Results Obtained on Tap 4 and Tap 5 Positions

Figure 8A:
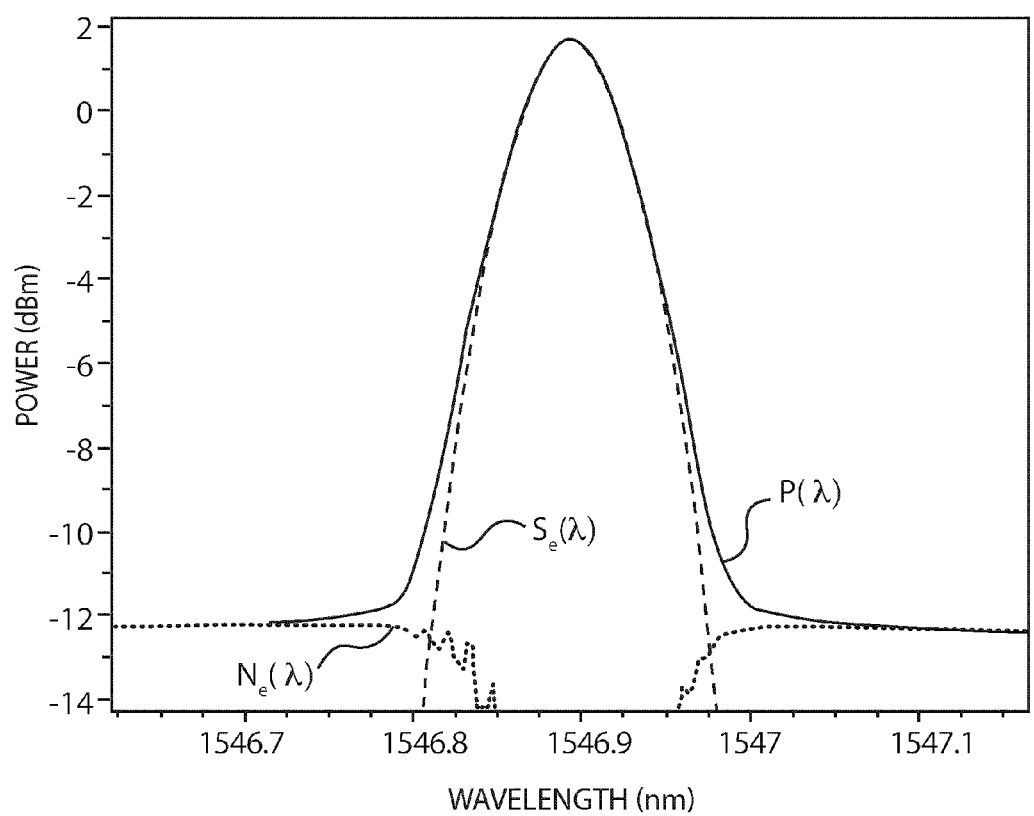
FIG. 8 comprises FIG. 8A, FIG. 8B and FIG. 8C which are graphs respectively showing the results of example 1, 3 and 5 of a processing algorithm used to estimate the noise contribution on the SUT obtained at Tap 4 of FIG. 2, using a reference trace obtained at Tap 1 of FIG. 2.
Figure 8B:
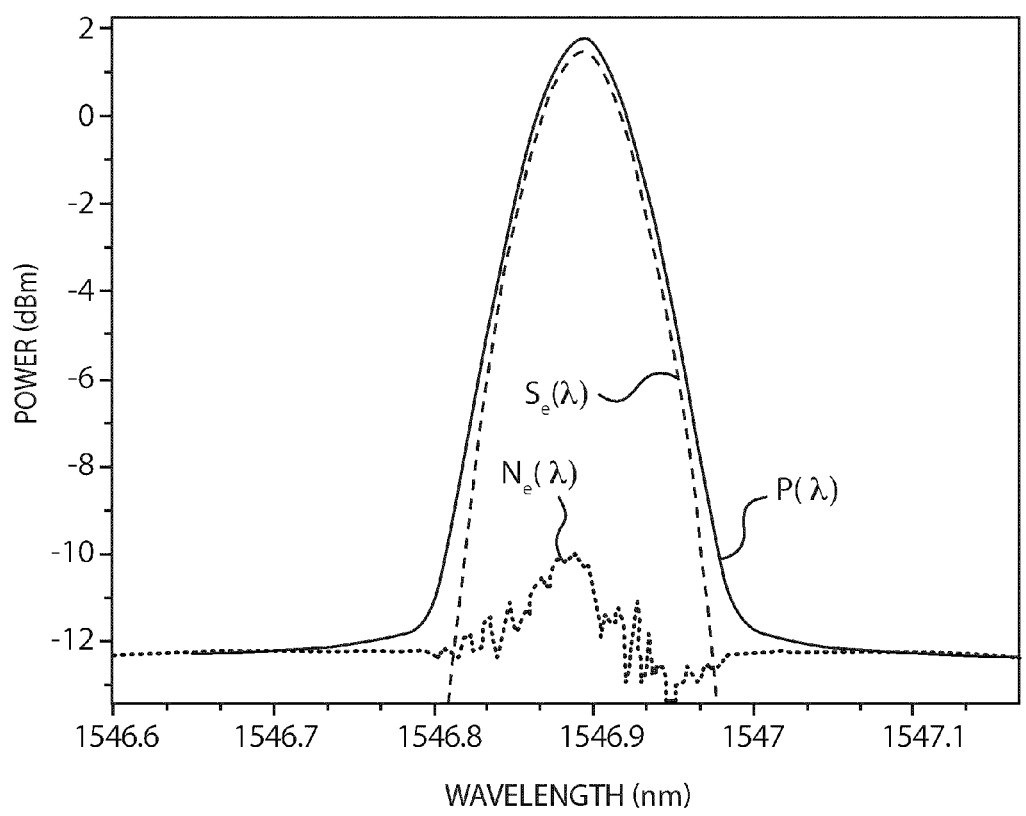
Figure 8C:
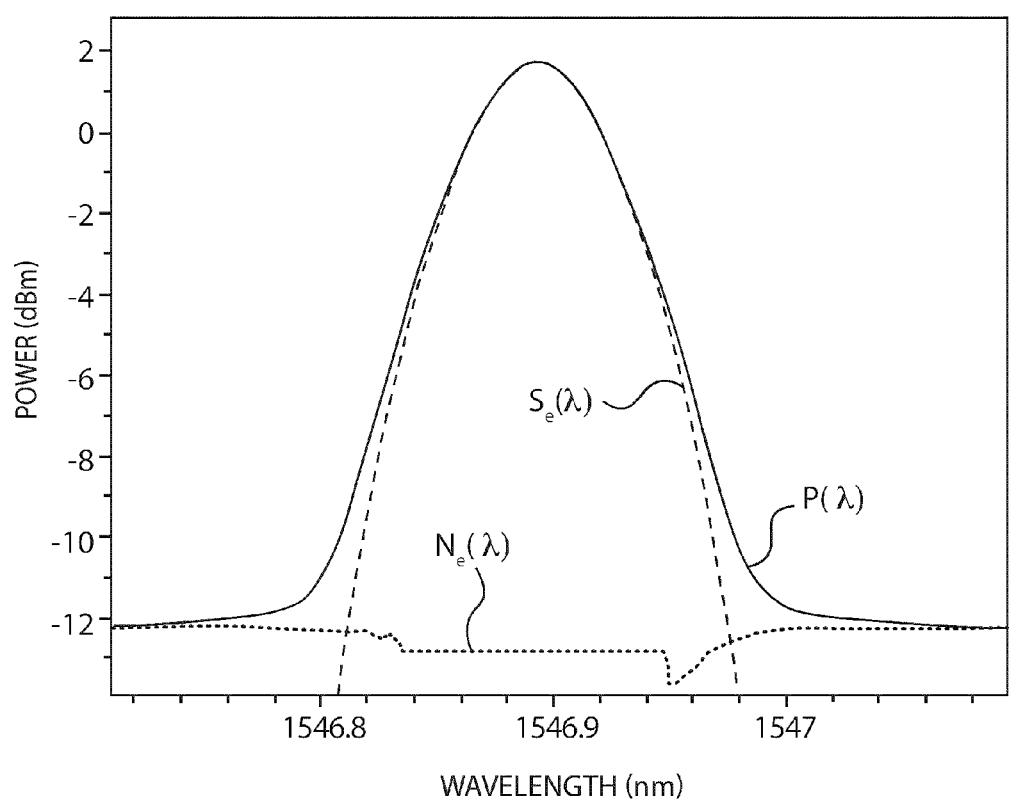

FIG. 8A, FIG. 8B and FIG. 8C respectively show the result of the processing algorithm of Examples 1, 3 and 5 as described above but performed with SUT traces obtained at Tap 4.

Figure 9A:
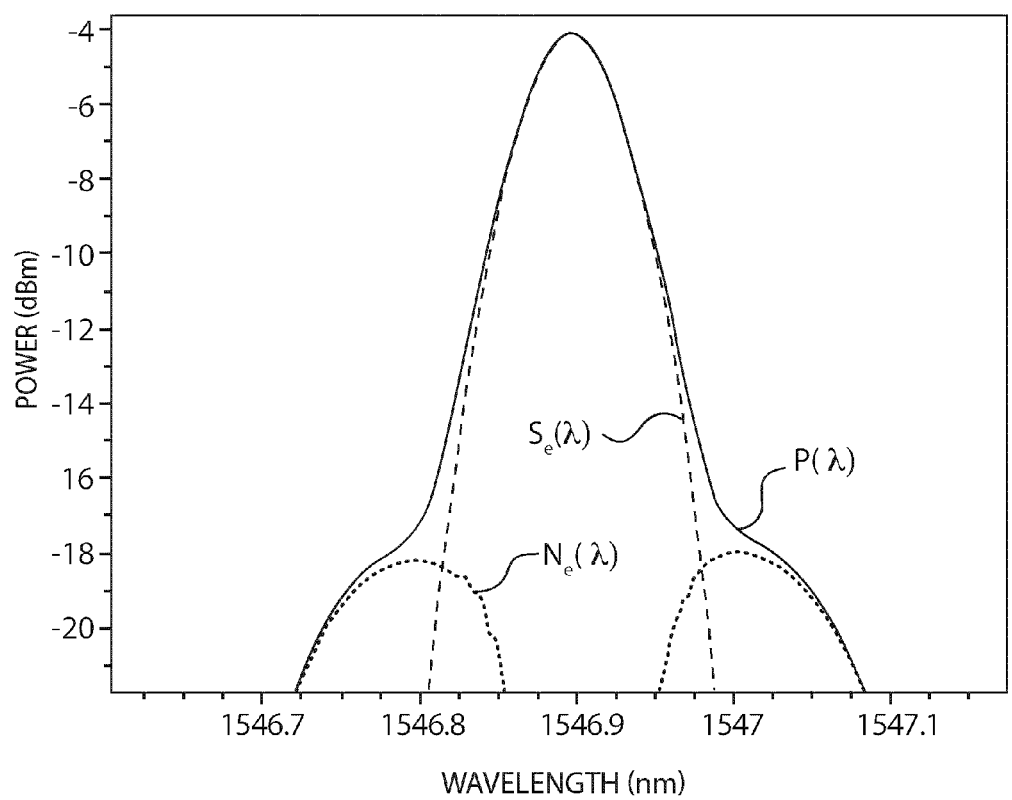
FIG. 9 comprises FIG. 9A, FIG. 9B and FIG. 9C which are graphs respectively showing the results of example 1, 3 and 5 of a processing algorithm used to estimate the noise contribution on the SUT obtained at Tap 5 of FIG. 2, using a reference trace obtained at Tap 1 of FIG. 2.
Figure 9B:
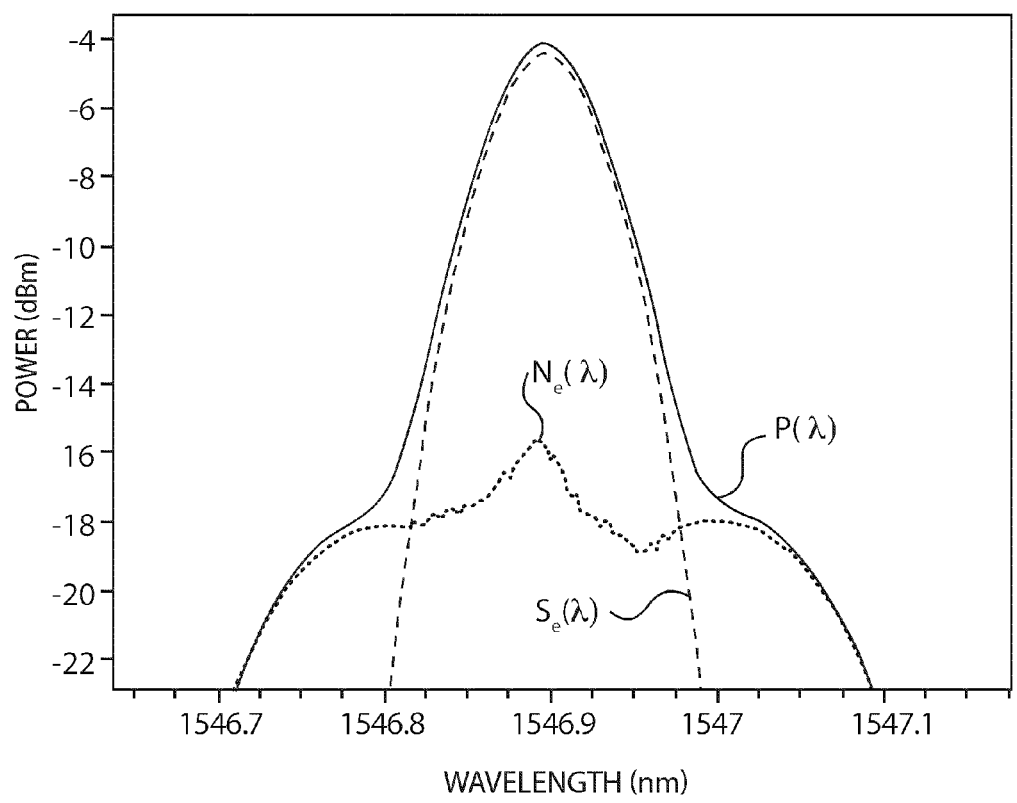
Figure 9C:
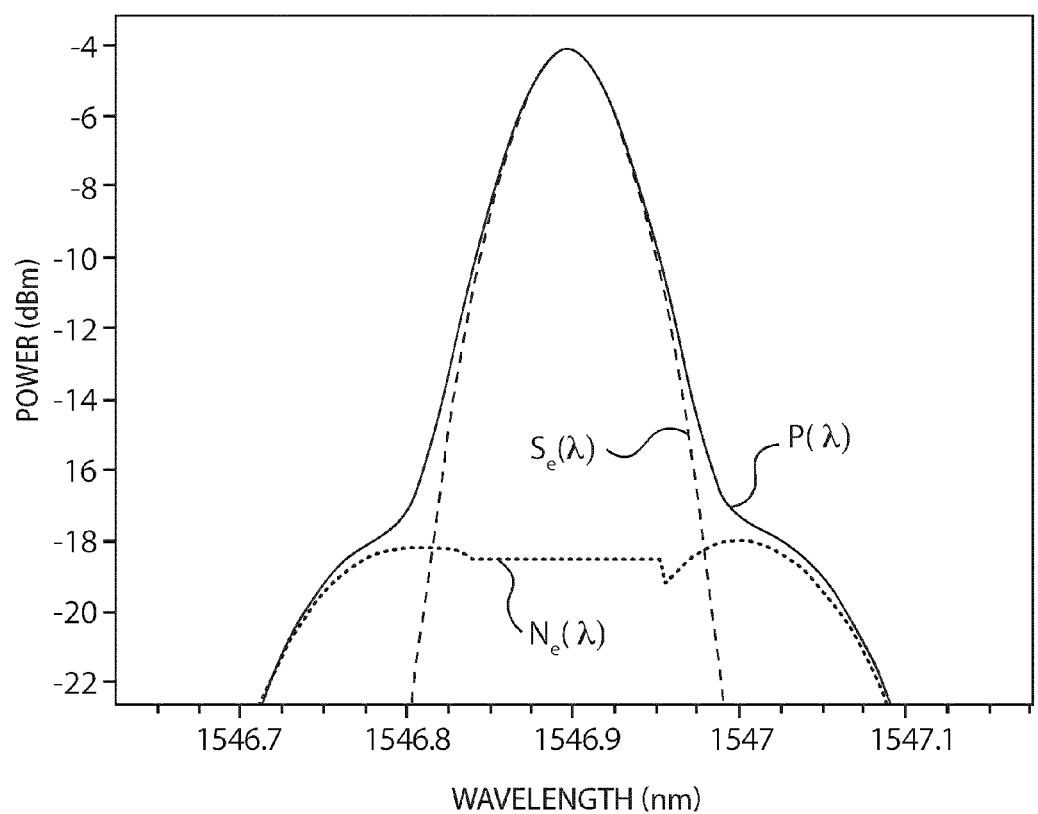

In a similar manner, FIG. 9A, FIG. 9B and FIG. 9C respectively show the result of the processing algorithm of Examples 1, 3 and 5 as described above but performed with SUT traces obtained at Tap 5.

Results Obtained with a Reference Signal Having a Known, Finite OSNR

Figure 10A:
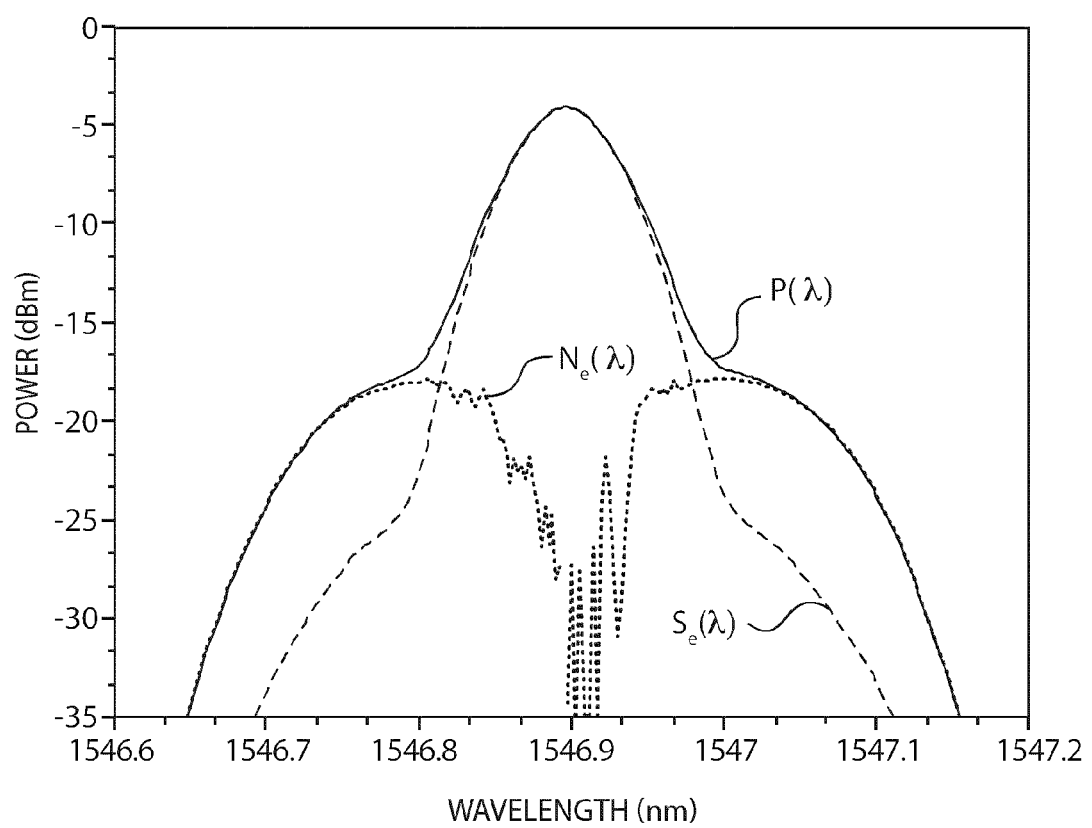
FIG. 10 comprises FIG. 10A, FIG. 10B and FIG. 10C which are graphs respectively showing the results of example 1, 3 and 5 of a processing algorithm used to estimate the noise contribution on the SUT obtained at Tap 5 of FIG. 2, using a reference trace obtained at Tap 3 of FIG. 2 wherein the OSNR is known; and, FIG. 11 is a schematic graph of an exemplary apparatus for determining an in-band noise parameter on an optical signal-under-test (SUT) propagating along an optical communication link.
Figure 10B:
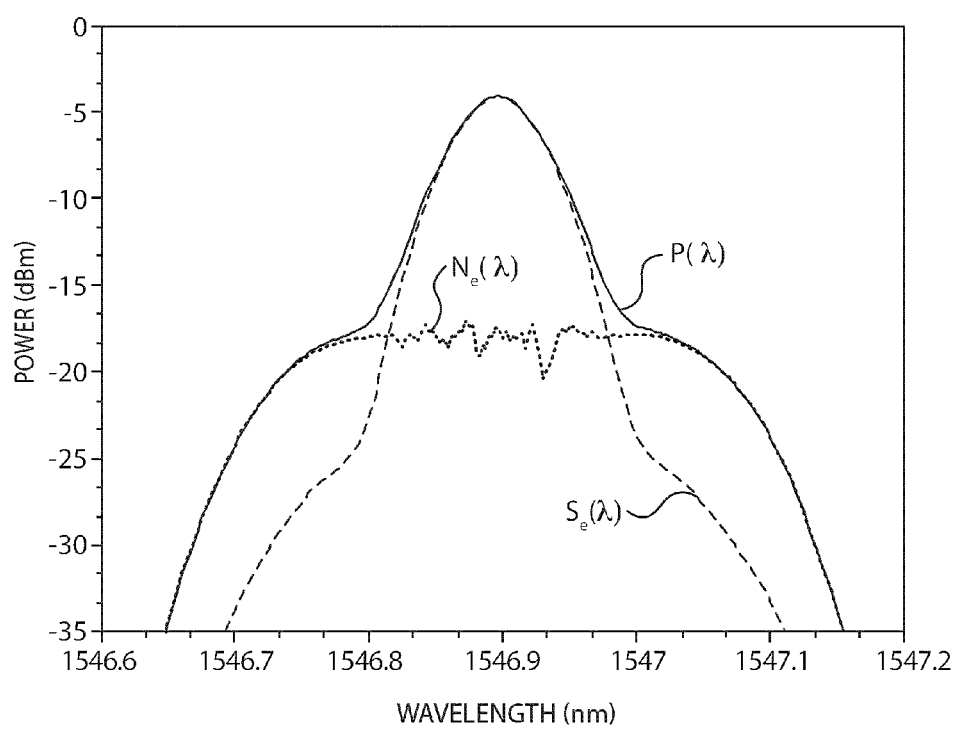
Figure 10C:
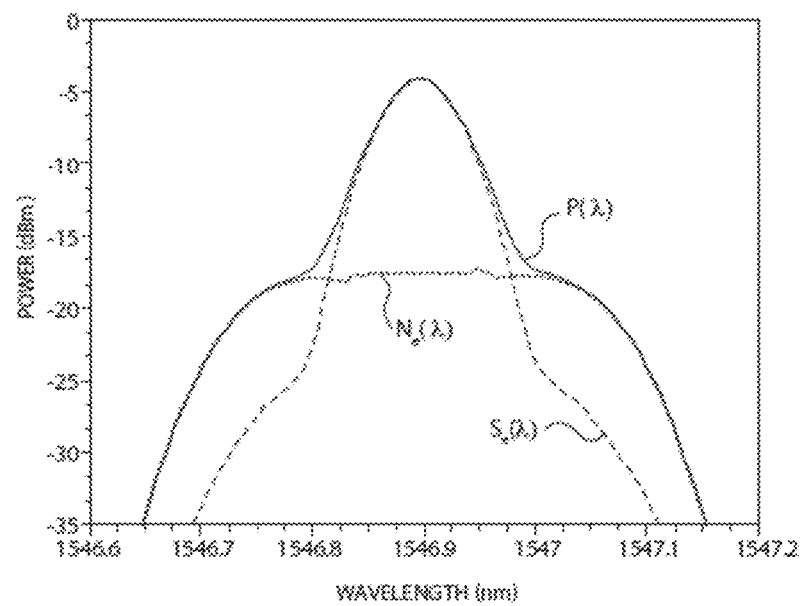

FIG. 10A, FIG. 10B and FIG. 10C show results of the processing algorithm of Examples 1, 3 and 5 as described above as performed with SUT traces obtained at Tap 5 and using as the reference signal, the signal at Tap 3 wherein the OSNR is known.

It should be appreciated that the processing algorithm methods described herein may be varied. For example, PCT patent application serial number PCT/CA2008/000647 filed on Apr. 4, 2008, designating the United States, now pending as a national phase entry in the United States under serial number U.S. Ser. No. 12/594,503, and PCT patent application serial number PCT/CA2010/001285 filed on Aug. 19, 2010 and designating the United States, both commonly owned by the Applicant and both specifications which being hereby incorporated by reference, describe some methods which may be adapted for mathematically discriminating the signal and noise contributions in the methods described herein.

For example, as mentioned hereinabove, for measuring the OSNR at Tap 5, instead of acquiring the reference spectral trace at Tap 1 for the channel under test, an alternate reference signal trace, for example from a representative transmitter available at Tap 6 conveniently physically co-located with Tap 5, may be used. The representative transmitter of Tap 6 may be operating at the channel wavelength of the SUT to be characterized, but on another communication link, i.e. 200, or at a different wavelength as long as its spectral shape, which is determined by the modulation rate and format, is similar enough to be representative. Since only relative spectral information is required for performing the methods described herein, a wavelength or frequency offset may easily be applied on the reference trace (at step 406 of the method of FIG. 4) to correct for the channel wavelength mismatch. It should be noted that differences in modulation rate of the representative transmitter of the reference signal and that of the SUT to be characterized may be adjusted via simple scaling of the wavelength/frequency axis.

Characterization of a SUT at any of the monitoring tap ports may also be made without resorting to the acquisition of the optical spectrum trace of a representative reference signal. This can be made by synthesizing a reference signal trace based on the knowledge of the modulation format of the transmitter at the source of the SUT. The synthesized reference signal trace may consist in a theoretical frequency dependant relative spectrum of the modulation format of interest convoluted with the spectral response of the measurement instrument. The modulation rate of the synthesized reference signal may be scaled to adapt to the specific SUT to be characterized and the central wavelength of the synthesized reference signal may also be offset to that of the SUT. Again, only a relative power spectral response is required.

Also, it should be appreciated that, although above examples employ optical taps to measure the signal at the respective tap points, the measurement of the spectrally-resolved optical power is not limited to such a "non-invasive" approach and may be undertaken by temporarily disrupting the continuity of the optical path (e.g. via an optical switch, or by physically disconnecting optical connectors). Such an approach may be acceptable for an optical channel not carrying customer traffic (e.g. during commissioning), especially if, for instance, many other DWDM channels are present to minimize the effect of resulting changes in the loading of the optical amplifiers in the network.

As explained above, in Examples 1, 3 and 5, the noise level is evaluated (step 412) at the cross-over wavelengths (circled areas A and B on FIGS. 5, 6 and 7) of the estimated signal contribution $S_e(\lambda)$ and noise contribution $N_e(\lambda)$. It should be appreciated that the noise level may be estimated from the estimated noise contribution $N_e(\lambda)$ using a different algorithm. For example, in the case of Example 3 (FIG. 6), the noise level may be estimated as the average of the estimated trace of the noise contribution $N_e(\lambda)$ over the optical signal bandwidth.

Furthermore, some example methods described herein assume a uniform noise contribution over the optical signal bandwidth in order to estimate the noise level at the signal peak using the estimated trace of the noise contribution Ne(λ). It is noted that the noise contribution is never totally uniform and that the presence of some non-uniformity will typically result in an error on the estimation of the noise level. The level of acceptable non-uniformity hence depends on the level of acceptable error on the noise parameter to be characterized.

The methods described herein provide for the measurement of OSNR or other in-band noise parameters on polarization-multiplexed signals. These methods may also be applicable to non-polarization-multiplexed signals where the state of polarization of the measured data-carrying signal is very rapidly scrambled, or as an alternative to polarization-based techniques, especially for certain types of signals and conditions for which polarization-based techniques offer limited results.

It should be appreciated that the methods described above are not limited to the characterization of optical signals having a signal carrier wavelength and that the SUT to be characterized may include a plurality of data-carrying signal contributions multiplexed using Nyquist Wavelength Division Multiplexing (N-WDM) (also referred to as superchannels in the scientific literature) or Orthogonal Frequency-Division Multiplexing (OFDM) for example.

In the present description, the steps of the methods are described in a specific order. It will be understood that the order of certain steps may be changed without departing from the invention. Similarly, steps from different methods described can be combined and re-organized without departing from the invention. Steps may also be omitted depending on the specific conditions of the problem to be solved without departing from the invention.

In particular, it should be appreciated that the formulation of the equations described in the embodiments and claims herein could be readily and equivalently rewritten in terms of OSNR (i.e. a dimensionless ratio) rather than in-band noise level.

Figure 11:
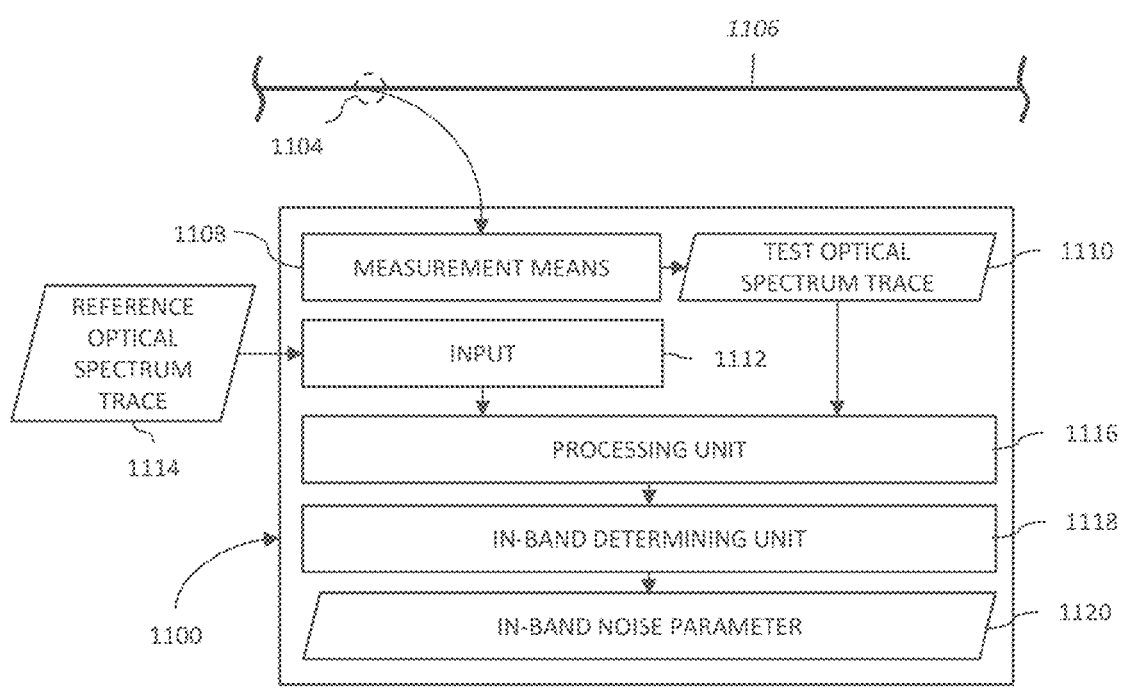

In one exemplary embodiment, the methods as disclosed herein are implemented in an apparatus 1100 for determining an in-band noise parameter as shown in FIG. 11. In this example, the apparatus 1100 is adapted to receive an optical signal-under-test (SUT) taken at a test point 1104 along an optical communication link 1106. The SUT to be characterized may be the optical signal as appearing at Tap 2, Tap 3, Tap 4, Tap 5, Tap 7 or Tap 8 of FIG. 2 for example. During use, an optical signal-under-test (SUT) propagates along the optical communication link 1106 and includes a data-carrying signal contribution of any arbitrary degree of polarization and a noise contribution within an optical signal bandwidth. The apparatus 1100 has measurements means 1108. The measurements means 1108 are generally provided in the form of a commercially available OSA which is adapted to obtain a test optical spectrum trace 1110 of said optical signal-under-test wherein the test optical spectrum trace 1110 corresponds to a spectral range encompassing a portion of the optical signal bandwidth. Further, the apparatus 1100 includes an input 1112 adapted to receive a reference optical spectrum trace 1114 of a reference signal comprising a data-carrying signal contribution spectrally representative of the data-carrying signal contribution of the signal-under-test and a noise contribution which is at least approximately known over the optical signal bandwidth, as discussed above. The processing unit 1116 is adapted to mathematically discriminate the data-carrying signal contribution from the noise contribution in the signal-under-test, within the optical signal bandwidth, using the test optical spectrum trace 1110 and a spectral shape trace of said data-carrying signal contribution in said signal-under-test estimated using said reference optical spectrum trace 1114. Then, an in-band noise determining unit 1118 determines the in-band noise parameter 1120 on said optical signal-under-test at least from the mathematically discriminated noise contribution.

The embodiments described above are intended to be exemplary only. The scope of the invention is therefore intended to be limited solely by the appended claims.

What is claimed is:

1. A method for determining an in-band noise parameter on an optical signal-under-test (SUT) propagating along an optical communication link and comprising a data-carrying signal contribution of any arbitrary degree of polarization and a noise contribution within an optical signal bandwidth, the method comprising:
    measuring a test optical spectrum trace of said optical signal-under-test at a test point along said optical communication link using an optical spectrum analyzer, said test optical spectrum trace corresponding to a spectral range encompassing at least a portion of said optical signal bandwidth;
    obtaining a reference optical spectrum trace of a reference signal comprising a data-carrying signal contribution spectrally representative of the data-carrying signal contribution of said signal-under-test, and a noise contribution which is at least approximately known over said optical signal bandwidth;
    estimating a spectral shape trace of said data-carrying signal contribution in said signal-under-test using said reference optical spectrum trace;
    using a processing unit, mathematically discriminating said data-carrying signal contribution from said noise contribution in said signal-under-test, within said optical signal bandwidth, using said spectral shape trace and said test optical spectrum trace; and
    determining said in-band noise parameter on said optical signal-under-test at least from the mathematically discriminated noise contribution.

2. The method as claimed in claim 1, wherein said mathematically discriminating comprises:
    estimating a ratio K defined as the ratio between said data-carrying signal contribution in said signal-under-test and said spectral shape trace; and
    calculating said noise contribution in said signal-under-test by subtracting from the test optical spectrum trace, said spectral shape trace multiplied by the ratio K.

3. The method as claimed in claim 2, wherein said mathematically discriminating is achieved by comparison of maximum values of said test optical spectrum trace and said reference optical spectrum trace, said mathematically discriminating comprising:
    calculating the ratio K of the maximum value of test optical spectrum trace and the maximum value of the reference optical spectrum trace over the optical signal bandwidth; and
    determining the spectrally-resolved noise contribution of said signal-under-test by subtracting the reference optical spectrum trace, multiplied by the ratio K, from the test optical spectrum trace.

4. The method as claimed in claim 3, wherein said noise contribution which is at least approximately known is determined from an estimated OSNR of said reference signal, said estimated OSNR being substantially higher than an OSNR of said signal-under-test.

5. The method as claimed in claim 2, wherein said mathematically discriminating comprises:
    correcting the reference optical spectrum trace to remove the noise contribution which is at least approximately known so as to obtain a reference optical spectrum trace that is noise-free, said ratio K being calculated using the corrected reference optical spectrum trace.

6. The method as claimed in claim 2, wherein said mathematically discriminating comprises:
    correcting the determined spectrally-resolved noise contribution by adding a correction term obtained from the ratio K and the noise contribution which is at least approximately known, so as to remove any noise contribution due to noise in the reference.

7. The method as claimed in claim 1, wherein said reference optical spectrum trace is acquired at a reference point along said optical communication link, which is different from said test point, said reference signal originating from the optical transmitter that is at the source of said optical signal-under-test.

8. The method as claimed in claim 1, wherein said reference optical spectrum trace is obtained from a theoretical optical spectrum trace of said optical signal-under-test.

9. The method as claimed in claim 1, wherein said reference optical spectrum trace is acquired at the output of an optical transmitter which is distinct but has relative spectral characteristics that are substantially representative of that of the optical transmitter at the source of said optical signal-under-test.

10. The method as claimed in claim 1, wherein at least one of said test optical spectrum trace and said reference optical spectrum trace are obtained via monitoring taps disposed on said optical communication link, thereby avoiding network disruption to obtain said at least one.

11. The method as claimed in claim 1, wherein said optical signal-under-test has at least some degree of unpolarization.

12. The method as claimed in claim 1, wherein said optical signal-under-test comprises polarization-multiplexed data-carrying signals.

13. The method as claimed claim 1, wherein said optical signal-under-test is being polarization scrambled at a rate significantly faster than the electronic detection bandwidth of a spectral resolution means used to acquire said test optical spectrum trace.

14. The method as claimed in claim 1, wherein said mathematically discriminating is achieved by differential comparison of said test optical spectrum trace and reference optical spectrum trace, said mathematically discriminating comprising:
   calculating a noise-free relative ratio K by dividing the difference of the test optical spectrum trace at two wavelengths $\lambda 1$ and $\lambda 2$ by the difference of the reference optical spectrum trace at same said two wavelengths $\lambda 1$ and $\lambda 2$; and
   calculating said noise contribution in said signal-under-test by subtracting from the test optical spectrum trace, said spectral shape trace multiplied by the ratio K.

15. The method as claimed in claim 1, wherein said mathematically discriminating is achieved by differential comparison of said test optical spectrum trace and reference optical spectrum trace, said mathematically discriminating comprising:
   processing said test optical spectrum trace with a first resolution bandwidth RBW1 and a second resolution bandwidth RBW2 to obtain respectively $P_{RBW1}$ and $P_{RBW2}$;
   processing said reference optical spectrum trace with the first resolution bandwidth RBW1 and the second resolution bandwidth RBW2 to obtain respectively $R_{RBW1}$ and $R_{RBW2}$;
   obtaining a relative accrual from RBW1 to RBW2 in the reference optical spectrum trace as a ratio $\alpha$ of $R_{RBW2}$ and $R_{RBW1}$; and
   estimating the noise comprised in the first resolution bandwidth RBW1 on the test optical spectrum trace using: $(P_{RBW2} - \alpha P_{RBW1})/(RBW2/RBW1 - \alpha)$.

16. The method as claimed in claim 1, wherein said mathematically discriminating is achieved by differential comparison of said test optical spectrum trace and said reference optical spectrum trace, said mathematically discriminating comprising:
   processing said test optical spectrum trace and said reference optical spectrum trace with a first resolution bandwidth RBW1 to obtain respectively $P_{RBW1}(\lambda)$ and $R_{RBW1}(\lambda)$;
   processing said test optical spectrum trace and said reference optical spectrum trace with a second resolution bandwidth RBW2 to obtain respectively $P_{RBW2}(\lambda)$ and $R_{RBW2}(\lambda)$, where RBW2 is greater than RBW1;
   calculating values of the processed traces at the wavelength $\lambda pk$ corresponding to the peak power value on the test optical spectrum trace to obtain $P_{RBW1}(\lambda pk)$, $R_{RBW1}(\lambda pk)$, $P_{RBW2}(\lambda pk)$ and $R_{RBW2}(\lambda pk)$;
   calculating the ratio K defined as the ratio between said data-carrying signal contribution in said signal-under-test and said spectral shape trace by using $K=((RBW2/RBW1)*P_{RBW1}(\lambda pk) - P_{RBW2}(\lambda pk))/((RBW2/RBW1)*R_{RBW1}(\lambda pk) - R_{RBW2}(\lambda pk))$; and
   calculating said noise contribution in said signal-under-test by subtracting from one of the processed test optical spectrum trace $P_{RBW1}(\lambda pk)$, $P_{RBW2}(\lambda)$, the corresponding processed reference optical spectrum trace $R_{RBW1}(\lambda pk)$, $R_{RBW2}(\lambda)$ multiplied by the ratio K.

17. The method as claimed in claim 1, wherein said noise parameter is the Optical Signal-to-Noise Ratio (OSNR) which is determined from the mathematically discriminated signal and noise contributions.

18. The method as claimed in claim 1, wherein said data-carrying signal contribution of said optical signal-under-test comprises a plurality of multiplexed data-carrying signal contributions.

19. A method for determining an optical signal-to-noise ratio of an optical signal-under-test (SUT) propagating along an optical path, comprising at least one data-carrying signal contribution of any arbitrary degree of polarization and a noise contribution within an optical signal bandwidth, wherein spectral resolution means are employed to measure the spectrally-resolved optical SUT, the method comprising:
   measuring spectrally-resolved optical spectrum data from said optical signal-under-test using an optical spectrum analyzer, said spectrally-resolved optical spectrum data corresponding to wavelengths within a spectral range encompassing a significant portion of said optical signal bandwidth;
   obtaining, from a different point along said optical path, different spectrally-resolved optical spectrum data from a reference signal, said reference signal comprising the same data-carrying signal contribution, and said reference signal being characterized by a known optical signal-to-noise ratio;
   using a processing unit, mathematically discriminating said at least one data-carrying signal contribution from said noise contribution within said optical signal bandwidth based on a mathematical comparison of said spectrally-resolved optical spectrum data and a spectral shape trace of said data-carrying signal contribution in said signal-under-test estimated using said different spectrally-resolved optical spectrum data;
   determining an in-band noise level on said optical SUT from the discriminated noise contribution; and
   determining the optical signal-to-noise ratio from the determined in-band noise level, the optical signal-to-noise ratio being indicative of the noise contribution within the optical signal bandwidth.

20. An apparatus for determining an in-band noise parameter on an optical signal-under-test (SUT) propagating along an optical communication link and comprising a data-carrying signal contribution of any arbitrary degree of polarization and a noise contribution within an optical signal bandwidth, the apparatus comprising:
   measurement means for obtaining a test optical spectrum trace of said optical signal-under-test at a test point along said optical communication link, said test optical spectrum trace corresponding to a spectral range encompassing at least a portion of said optical signal bandwidth;
   an input for receiving a reference optical spectrum trace of a reference signal comprising a data-carrying signal contribution spectrally representative of the data-carrying signal contribution of said signal-under-test, and a noise contribution which is at least approximately known over said optical signal bandwidth;
   processing unit for mathematically discriminating said data-carrying signal contribution from said noise contribution in said signal-under-test, within said optical signal bandwidth, using said test optical spectrum trace and a spectral shape trace of said data-carrying signal contribution in said signal-under-test estimated using said reference optical spectrum trace; and
   an in-band noise determining unit for determining said in-band noise parameter on said optical signal-under-test at least from the mathematically discriminated noise contribution.

* * * * *